(12) United States Patent
Miura et al.

(10) Patent No.: US 7,620,321 B2
(45) Date of Patent: Nov. 17, 2009

(54) OPTICAL TRANSMITTING APPARATUS, METHOD OF INCREASING THE NUMBER OF PATHS OF THE APPARATUS, AND OPTICAL SWITCH MODULE FOR INCREASING THE NUMBER OF PATHS OF THE APPARATUS

(75) Inventors: Akira Miura, Kawasaki (JP); Hiroki Ooi, Kawasaki (JP); Takeshi Hoshida, Kawasaki (JP); Takafumi Terahara, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 549 days.

(21) Appl. No.: 11/092,547

(22) Filed: Mar. 29, 2005

(65) Prior Publication Data

US 2006/0098981 A1    May 11, 2006

(30) Foreign Application Priority Data

Nov. 10, 2004    (JP)    .............................. 2004-326556

(51) Int. Cl.
    *H04J 14/00*    (2006.01)

(52) U.S. Cl. .............................. 398/45; 398/48; 398/49; 398/50; 398/83

(58) Field of Classification Search .................... 398/45, 398/48–50, 55–57, 79, 83
See application file for complete search history.

(56) References Cited

U.S. PATENT DOCUMENTS

| 6,263,127 B1 | 7/2001 | Dragone |
| 6,301,037 B1 * | 10/2001 | Fischer et al. ................ 398/201 |
| 6,538,784 B1 * | 3/2003 | Lee et al. ........................ 398/82 |
| 6,626,590 B1 * | 9/2003 | Nagatsu et al. ................. 398/59 |

(Continued)

FOREIGN PATENT DOCUMENTS

JP    08-065241    3/1996

(Continued)

OTHER PUBLICATIONS

Japanese Patent Office Action in Japanese Patent Application No. 2004-326556 (dated Mar. 10, 2009).

(Continued)

*Primary Examiner*—Ken N Vanderpuye
*Assistant Examiner*—Hibret A Woldekidan
(74) *Attorney, Agent, or Firm*—Hanify & King P.C.

(57) ABSTRACT

An optical transmitting apparatus is configured such that K pieces of output ports of optical path switching units whose input port is connected to k-th input transmission path are connected to first to K-th output transmission paths except for the k-th output transmission path and to the k-th input port of a dropping unit, and the optical path switching units and the dropping unit outputs light of wavelength which is part or all of WDM light received from said input port from a specific output port, and can output light having a wavelength different from that of the light output from said specific output port from an output port different from said specific output port. Accordingly, while largely reducing the number of optical fiber patch cords necessary in an optical transmitting apparatus and largely reducing the number of spare ports, the flexible expansion of apparatus function can be realized.

8 Claims, 16 Drawing Sheets

U.S. PATENT DOCUMENTS

| | | | |
|---|---|---|---|
| 7,308,197 B1 * | 12/2007 | Zhong et al. | 398/48 |
| 2002/0186434 A1 * | 12/2002 | Roorda et al. | 359/128 |
| 2005/0226551 A1 * | 10/2005 | Pichler et al. | 385/17 |

FOREIGN PATENT DOCUMENTS

| | | |
|---|---|---|
| JP | 08-079806 | 3/1996 |
| JP | 08-130756 | 5/1996 |
| JP | 8-237221 | 9/1996 |
| JP | 08-237221 | 9/1996 |
| JP | 08-340319 | 12/1996 |
| JP | 11-218790 | 7/1999 |
| JP | 11-177624 | 8/1999 |
| JP | 2000-244951 | 9/2000 |
| JP | 2000-295177 | 10/2000 |
| JP | 2000347065 | 12/2000 |
| JP | 2003-018625 | 1/2003 |
| JP | 2003-101479 | 4/2003 |
| JP | 2004-242149 | 8/2004 |
| JP | 2004-532544 | 10/2004 |

OTHER PUBLICATIONS

Japanese Official Action dated Aug. 5, 2008 in the corresponding Japanese Application No. JP2004-326556 with English Translation.

* cited by examiner

FIG. 9

Definition and comparison between P/R/DOADM

| Name | (1) Passive OADM | (2) Reconfigurable OADM | (3) Dynamic OADM |
|---|---|---|---|
| Configuration (example) | full band tunable | full band tunable | full band tunable |
| drop/thru automatically switchable? | No (manual) | Yes | Yes |
| ability to add any l into any port | unachievable (should select port) | unachievable (should select port) | achievable |
| ability to drop any l into any transponder | unachievable | unachievable | achievable |
| reconnection between OADM and transponder | manual | manual | No necessary |

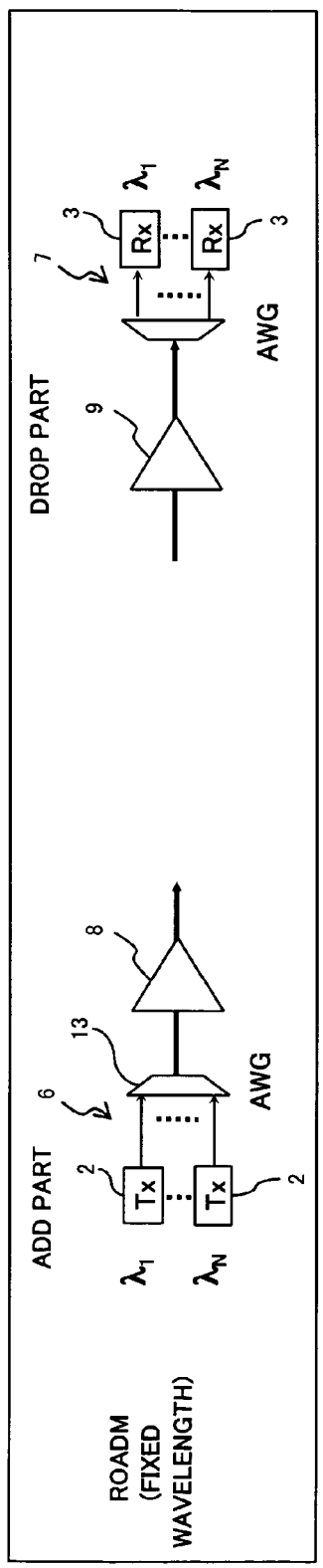
FIG. 10A ROADM (FIXED WAVELENGTH)
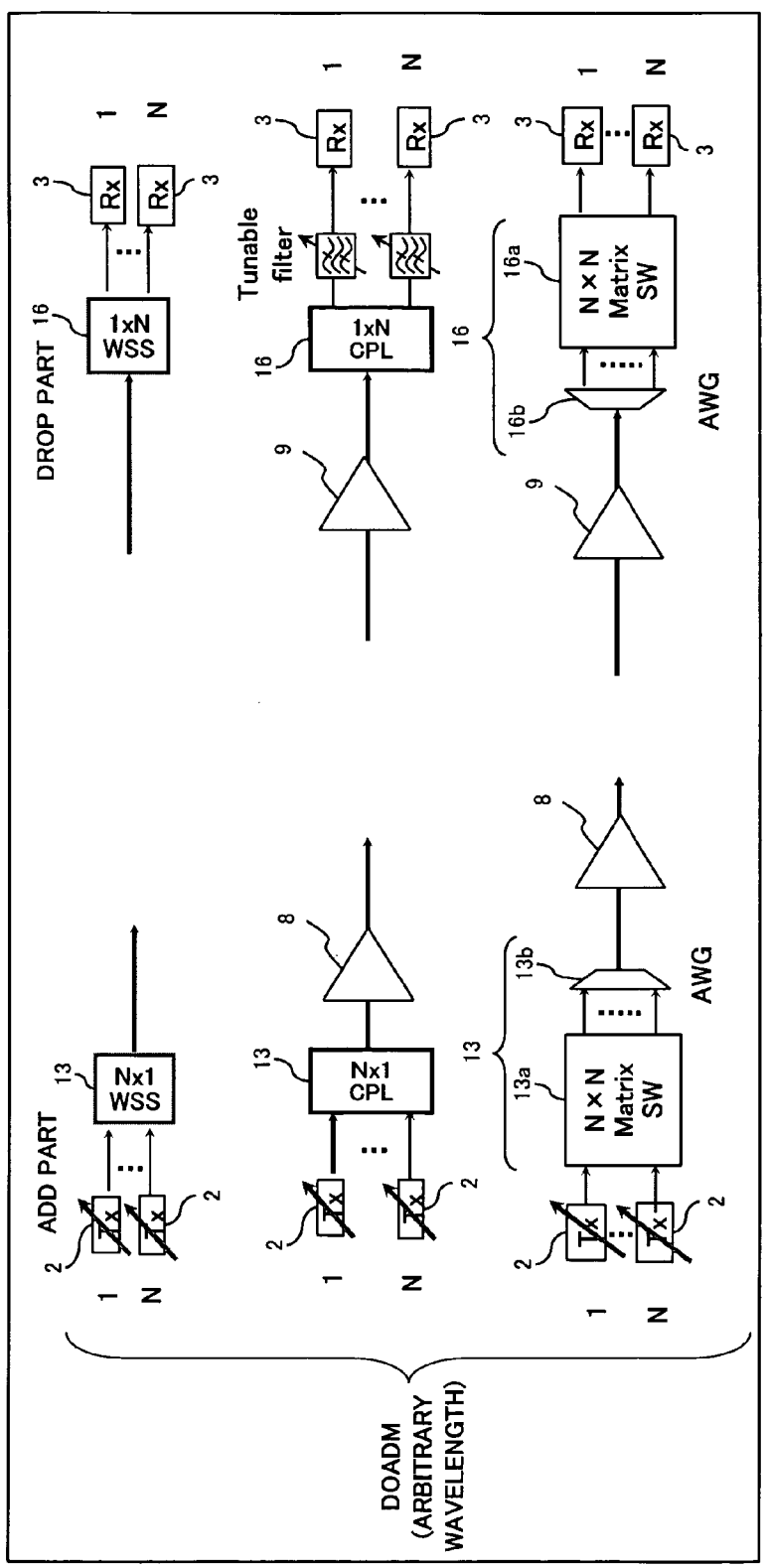
FIG. 10B DOADM (ARBITRARY WAVELENGTH)

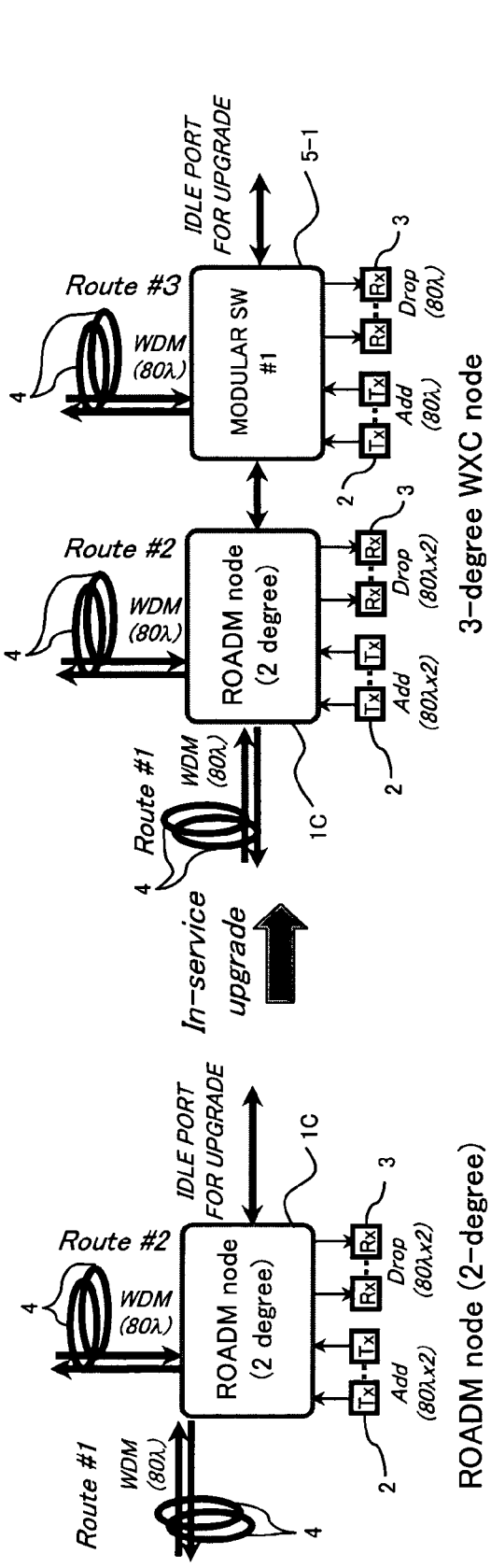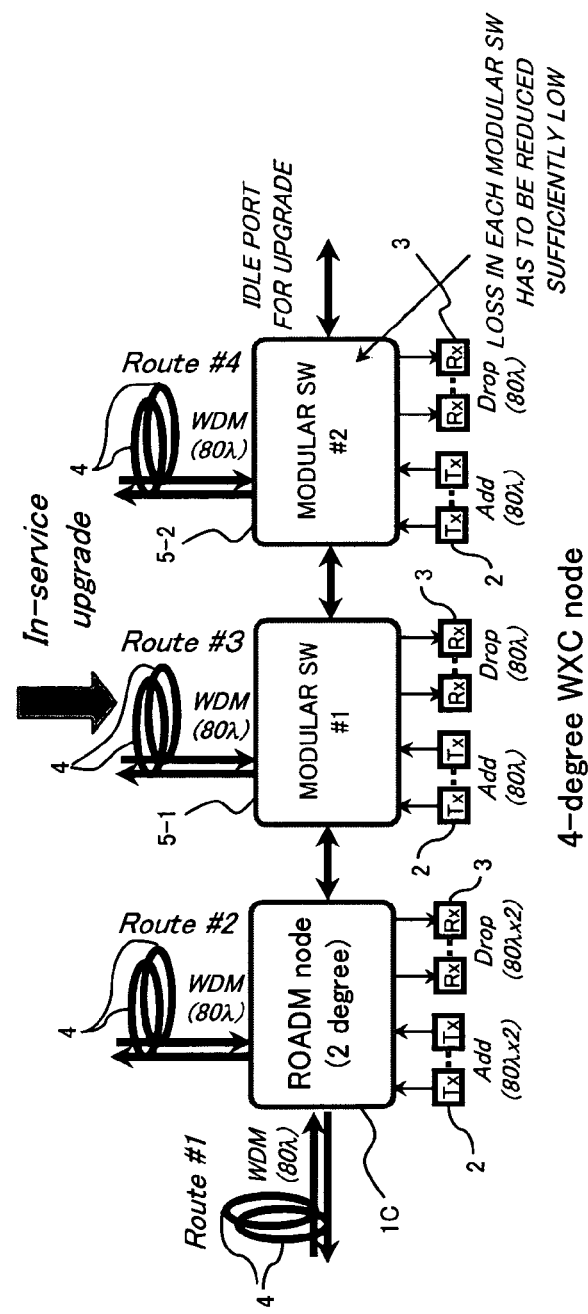

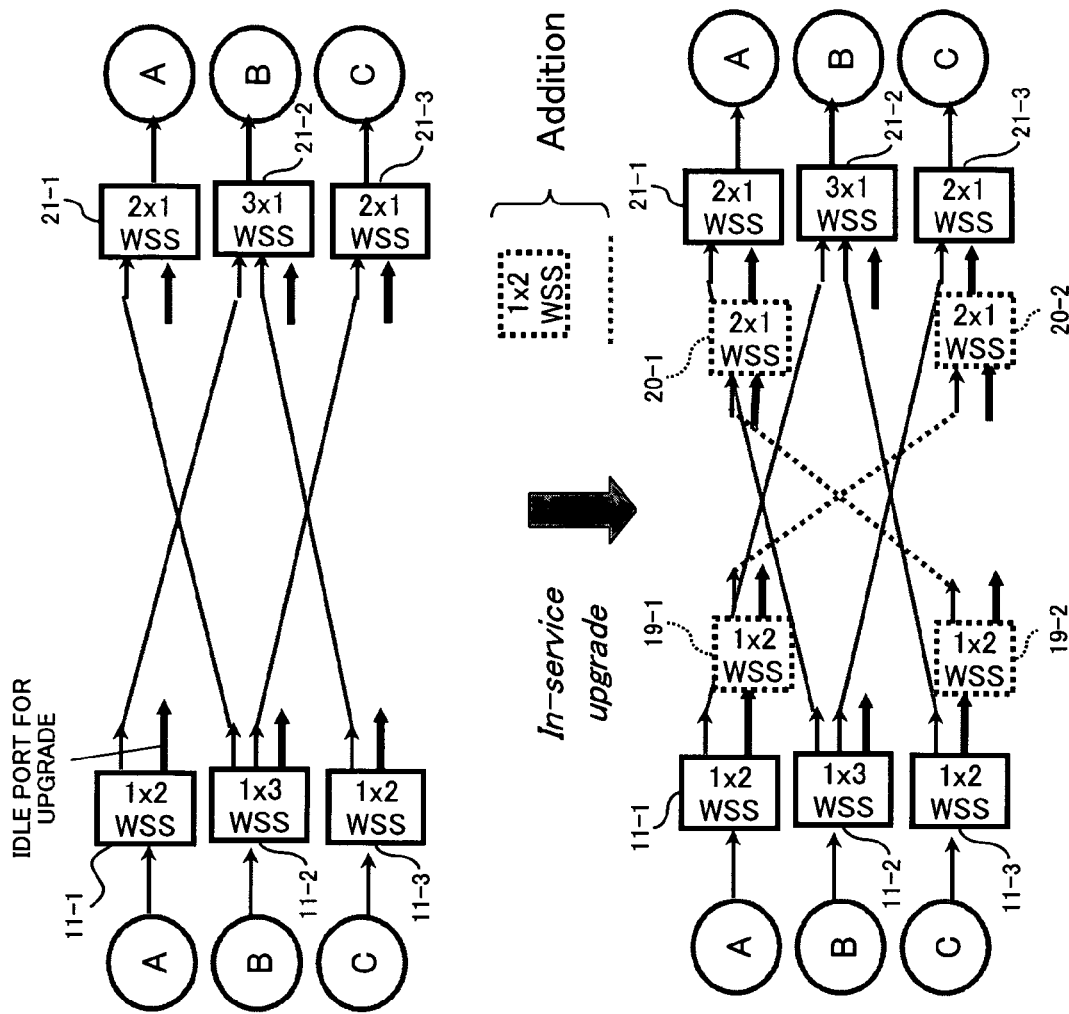
FIG. 14B
FIG. 14C
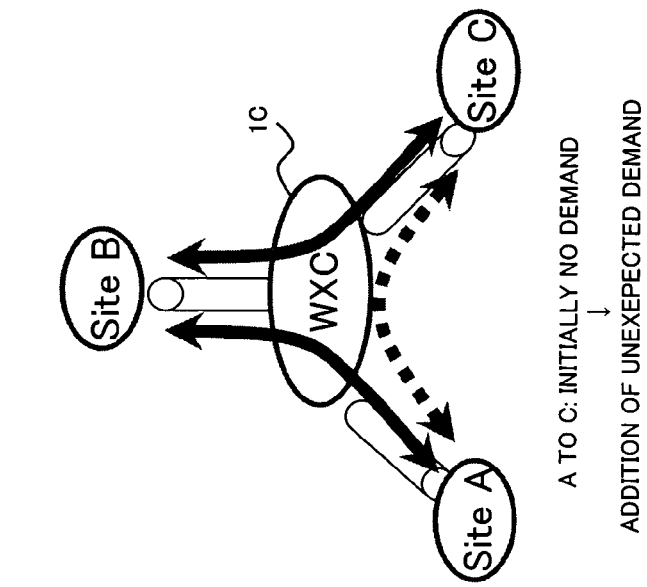
FIG. 14A

OPTICAL TRANSMITTING APPARATUS, METHOD OF INCREASING THE NUMBER OF PATHS OF THE APPARATUS, AND OPTICAL SWITCH MODULE FOR INCREASING THE NUMBER OF PATHS OF THE APPARATUS

CROSS REFERENCE TO RELATED APPLICATIONS

This application is based on and hereby claims priority to Japanese Application No. 2004-326556 filed on Nov. 10, 2004 in Japan, the contents of which are hereby incorporated by reference.

BACKGROUND OF THE INVENTION (1) Field of the Invention

The present invention relates to an optical transmitting apparatus, a method of increasing the number of paths of the apparatus, and an optical switch module for increasing the number of paths of the apparatus and, more particularly, to a technique suitable for use in an optical transmitting apparatus having an optical cross connecting function and an optical add-drop function.

(2) Description of Related Art

In a wavelength division multiplex (WDM) optical transmitting system, an optical cross connect function of changing the destination of input light every wavelength of WDM light and an optical add and drop multiplexing (OADM) function of outputting (adding) add signal light having an arbitrary wavelength to an arbitrary path and branching (dropping) and receiving signal light having an arbitrary wavelength from an arbitrary path are in increasing demand.

FIG. 15 is a block diagram showing an example of the configuration of a conventional optical cross connect apparatus (optical transmitting apparatus). An optical cross connect apparatus (hereinbelow, also called a node) 100 shown in FIG. 15 is an optical cross connect apparatus to/from which WDM signal lights having 80 wavelengths (80 channels) $\lambda 1$ to $\lambda 80$ at the maximum are input/output for each of four transmission paths #1, #2, #3, and #4 and which can branch (drop)/insert (add) signal lights of 10 wavelengths at the maximum. The optical cross connect apparatus 100 has a plurality of (four) demultiplexers 101 provided for the transmission paths (input transmission paths) #1, #2, #3, and #4, a switch fabric 102 constructed by using a matrix switch (MXS), and a plurality of (four) multiplexers 103 provided for transmission paths (output transmission paths) #1, #2, #3, and #4. In FIG. 15, 200 denotes optical transmitters for 10 wavelengths each for transmitting signal light (add signal lights #1 to #10) to be added to an arbitrary transmission path #i (where i=1 to 4), and 300 denotes optical receivers for 10 wavelengths each for receiving signal light (drop signal lights #1 to #10) dropped from the arbitrary transmission path #i.

Each of the demultiplexers 101 has wavelength selectivity and is provided to demultiplex input WDM light (in which 80 waves of $\lambda 1$ to $\lambda 80$ are multiplexed at the maximum per transmission path) by wavelength. The switch fabric 102 is a switch capable of transmitting input signal light which is input to any of input ports to any output port except for an output port of the same transmission path. In FIG. 15, since WDM signal lights having 80 wavelengths $\lambda 1$ to $\lambda 80$ are input/output to/from each of the four transmission paths #1 to #4 and signal lights having 10 wavelengths are dropped/added, 330 input ports (=4×80+10) and 330 output ports (total 660 ports) are provided. Each of the multiplexers 103 multiplexes signal lights having 80 wavelengths at the maximum output from each of the output ports of the switch fabric 102 and outputs the resultant light to a corresponding output transmission path #i.

With such a configuration, in the conventional optical cross connect apparatus 100, WDM light input from any input transmission path #i or add signal light #x (where x=any of 1 to 10) output from any of the optical transmitters 200 is input to the switch fabric 102 on the wavelength unit basis via a predetermined input port and the destination (output port) is changed on the wavelength unit basis in the switch fabric 102. The destination is switched to an output transmission path #j (where j is any of 1 to 4 and j≠i) which is different from the input transmission path #i. The signal light after the path has been changed is multiplexed by the multiplexer 103 and output as WDM light to corresponding one of the output transmission paths #1, #2, #3 and #4 or received as dropped signal light #x by any of the optical receivers 300.

In such a manner, the conventional optical cross connect apparatus 100 can switch the path of WDM light which is input from an arbitrary input transmission path #i to an arbitrary output transmission path #i on the wavelength unit basis, and add an add signal light #x to the WDM light to the arbitrary output transmission path #i or drop signal light #x having arbitrary wavelength of the WDM light from an arbitrary input transmission path #i.

Another optical cross connect apparatus is disclosed in, for example, Japanese Patent Application Laid-Open No. H8-237221 (Patent Document 1). The conventional technique of Patent Document 1 is directed to increase flexibility in expansion of the number of input/output highways and the number of input/output links and to facilitate switching of a signal channel. In the conventional technique, as shown in FIG. 1 of Patent Document 1, the apparatus includes: N1 pieces of 1-input M-output optical demultiplexers for separating light signals of N1 series into M signal channels; N1 pieces of M-input (N1+N2)-output optical switches for allocating the signal channels to output destinations (highways) of the N1 series or reception (drop) destinations of N2 series; N2 pieces of M-input N1-output optical switches for allocating signal channels transmitted from an optical signal (add signal light) transmitter to output destinations (highways) of the N1 series; N1 pieces of (N1+N2)-input 1-output optical combiners for combining outputs of the optical switches for each of output destinations of the N1 series; a wavelength converting circuit disposed between the optical signal transmitter and the M-input N1-output optical switches; and N2 pieces of N1-input M-output wavelength selection optical switches for allocating outputs of the M-input (N1+N2)-output optical switches to M receivers (drop destinations) by wavelength selection.

The configuration corresponds to a configuration obtained by constructing the switch fabric 102 shown in FIG. 15 by N1 pieces of M-input (N1+N2)-output optical switches, N2 pieces of M-input N1-output optical switches, N1 pieces of (N1+N2)-input 1-output optical combiners, and N2 pieces of N1-input M-output wavelength selection optical switches.

With the configuration, in the conventional technique, as described in the columns 0023 to 0025, optical signals of the N1 series whose wavelengths are multiplexed are separated into different signal channels and, after that, by using the N1 pieces of M-input (N1+N2)-output optical switches, the signal channels are allocated to the output destinations of the N1 series or the receive (drop) destinations of the N2 series. On the other hand, optical signals of the N2 series to be transmitted (added) are subjected to a wavelength converting process by the wavelength converting circuit every signal channel, and the processed signals are allocated to the output destinations (highways) of the N1 series. The signal channels allocated to the output destinations of the N1 series are combined every destination. At this time, the wavelength of a signal channel to be transmitted (added) can be arbitrarily set, so that the path of the signal channel can be easily switched.

With respect to the signal channels allocated as the receive (drop) destinations of the N2 series from the N1 pieces of M-input (N1+N2)-output optical switches, a signal channel having an arbitrary wavelength on an arbitrary input optical highway can be output to an arbitrary output link without causing wavelength collision by wavelength selection by the N1-input M-output wavelength selection optical switch. Consequently, it becomes unnecessary to consider wavelength dependency in an output link at the time of setting the wavelength of a signal channel.

In such a manner, switch of signal channels between an input and an output (optical cross connect) and switch of a receive (drop) signal channel and a transmit (add) signal channel (OADM) can be simultaneously performed.

The conventional optical cross connect apparatus has, however, the following problems.

(1) Problems on the Number of Ports, Cost, and Size in the Conventional Node Configuration In the optical cross connect apparatus described with reference to FIG. 15, signal light having a single wavelength is input/output to/from each of input/output ports of the switch fabric 102 (MXS). Therefore, when the number of wavelengths of signal light to be input/output from/to the optical cross connect apparatus increases, the number of input/output ports of the switch fabric 102 becomes very large. Accordingly, the size of the whole apparatus becomes large and the number of optical fiber patch cords to be connected to the switch fabric 102 also becomes enormous. A problem occurs such that it becomes very inconvenient to house and manage the optical fiber patch cords.

Further, to address future increase in the number of input/output transmission paths and drop/add signal light, input/output ports of the maximum predictable wavelengths have to be prepared. Therefore, an enormous switch fabric 102 is necessary from the initial operation. For example, in the configuration shown in FIG. 15, WDM lights having 80 wavelengths at the maximum are input/output to/from each of the four transmission paths #1 to #4 and signal lights of 10 wavelengths are dropped/added. Consequently, each of the number of input/output ports necessary for the switch fabric 102 (MXS) and the number of optical fiber patch cords connected to the switch fabric 102 (MXS) is as enormous as 660. For example, if there is the possibility that one input/output transmission path will be added in the future, 160 input/output ports are necessary as spare ports from the start of use of the apparatus.

The technique of Patent Document 1 has points similar to those points. For example, if the number of input/output wavelengths (M) increases, the number of input/output ports necessary for the optical switches and the optical combiners also increases, so that the apparatus scale and cost increase. In particular, since the number of input/output ports which can be provided for the optical switches and optical combiners is limited in the present techniques, in the case where optical signals of tens of wavelengths are multiplexed per highway, the technique cannot be realized. Moreover, also in the case of addressing future increase in the number of input/output transmission paths and increase in drop/add signal lights, input/output ports of the predictable maximum number of wavelengths have to be prepared for spare (unused) optical switch and optical combiner, so that the apparatus becomes large-scaled and expensive from the initial operation.

(2) Problems on Increase in the Number of Paths (Transmission Paths) in-Service in Conventional Node Configuration The users strongly demand for in-service upgrading (upgrading which does not interrupt signals being transmitted) from an ROADM node (Reconfigurable OADM node of 2 degrees (where 2 degrees denotes that the number of transmission paths to be handled is two): a node for remotely switching between a transmission signal and drop/add signal light every wavelength) as shown in FIG. 16A to a wavelength cross connect (WXC) node of 3 degrees as shown in FIG. 16B, or from 3 degrees to a WXC node of four or higher degrees as shown in FIG. 16C.

However, in the conventional node configuration shown in FIG. 15, as described above, the number of degrees to be finally requested is predicted, and the switch fabric 102 having the maximum configuration which can deal with signals at the expected number of degrees has to be prepared from the initial operation. For example, as shown in FIG. 17, in the case where a matrix switch 120 of 80 inputs and 80 outputs (80×80) is used and the final number of degrees is expected as four, eight signal lights of one wavelength exists (4 (for transmission signal)+4 (in the case of 100% add-drop)), 10 wavelengths (80÷8) are allocated to one matrix switch 120.

When it is assumed that the number of degrees upon initial introduction is two, 40 input/output ports (=[(2 (transmission signals)+2 (for add/drop signals)]×10 wavelengths) of the matrix switch 120 are used out of 80 input/output ports of one matrix switch 120 but the remaining 40 input/output ports become unused (spare) ports. That is, the same cost as that in the final form is necessary at the initial introduction. Moreover, in the case where upgrading to the number of degrees over expectation is requested, the request cannot be addressed.

The technique of Patent Document 1 also has the same problem. It is necessary to predict the number of degrees finally requested and preliminarily prepare spare optical switches and optical combiners of the maximum configuration capable of handling signals of the predicted number of degrees.

SUMMARY OF THE INVENTION

The invention has been achieved in consideration of such problems and an object of the invention is to realize flexible function expansion of an optical transmitting apparatus while largely reducing the number of wires (optical fiber patch cords) (reducing the size of the apparatus) necessary in an optical transmitting apparatus dealing with a plurality of transmission paths such as an optical cross connect apparatus and largely reducing the number of spare ports required for future increase in the number of transmission paths.

In order to achieve the above-mentioned object, the optical transmitting apparatus of the present invention is an apparatus to which first to K-th (where K denotes an integer of 2 or larger) input transmission paths and first to K-th output transmission paths are connected and which has dropping means, and comprises K pieces of optical path switching means each having an input port connected to said k-th (where k denotes an integer from 1 to K) input transmission path, and K pieces of output ports. The optical transmitting apparatus is characterized in that the dropping means has K pieces of input ports connected to said first to K-th optical path switching means, and an output port, said K pieces of output ports of said optical path switching means whose input port is connected to said k-th input transmission path are connected to said first to K-th output transmission paths except for the k-th output transmission path and to the k-th input port of said dropping means, and said optical path switching means and said dropping means output light of wavelength which is part or all of wavelength division multiplex light received from said input port from a specific output port, and can output light having a wavelength different from that of the light output from said specific output port from an output port different from said specific output port.

Further, the optical transmitting apparatus of the present invention is an apparatus to which first to K-th (where K denotes an integer of 2 or larger) input transmission paths and first to K-th output transmission paths are connected and which has D pieces (where D denotes a natural number) of dropping means, and comprises K pieces of optical path switching means each having an input port connected to said k-th (where k denotes an integer from 1 to K) input transmission path, and K pieces of output ports, and K pieces of drop light switching means each having an input port and D pieces of output ports connected to the first to said D-th dropping means. The optical transmitting apparatus is characterized in that said K pieces of output ports of said optical path switching means whose input port is connected to said k-th input transmission path are connected to said first to K-th output transmission paths except for the k-th output transmission path and the input port of said dropping means, and said optical path switching means and said dropping light switching means output light of wavelength which is part or all of wavelength division multiplex light received from said input port from a specific output port and can output light having wavelength different from that of the light output from said specific output port from an output port different from said specific output port.

Moreover, as the other configuration of the optical transmitting apparatus of the present invention, the apparatus comprises optical path switching means having a plurality of input ports connected to a plurality of input optical transmission paths for transmitting wavelength division multiplex signal light (WDM light) and a plurality of output ports connected to a plurality of output optical transmission paths for transmitting WDM light, capable of selecting signal light of one or more wavelength included in the WDM light received from any of the input ports and outputting the selected signal light from any of the outports, add wavelength output means which combines add signal light of a plurality of wavelengths to obtain combined signal light and selectively couples add signal light having one or more wavelengths included in the combined signal light, as signal light to be multiplexed to WDM light to any of the output optical transmission paths, to any of the output ports of the optical path switching means, and drop wavelength output means which selectively receives and combines the signal light having one or more wavelengths included in the WDM light input to each of the input ports of the optical path switching means and selectively outputs signal light included in the combined signal light on a wavelength unit basis.

The optical transmitting apparatus is an apparatus to which WDM light of the maximum N wavelengths (where N denotes an integer of 2 or larger) is input from each of K pieces (where K denotes an integer of 2 or larger) of input optical transmission paths and which outputs WDM light of the maximum N wavelengths to each of the K pieces of output optical transmission paths. When the minimum integer of integers M satisfying the relation of $M \geq I\_add/N$ where wavelength of add signal light to be output to any of the output optical transmission paths is set as I_add and wavelength of drop signal light to be dropped from any of the input optical transmission paths is set as I_drop is M_add, and the minimum integer of integers M' satisfying the relation of $M' \geq I\_drop/N$ is M_drop, the optical path switching means comprises K pieces of 1×(K+M_drop−1) wavelength selecting switches provided for the K pieces of input optical transmission paths and selectively outputting signal light of one or more arbitrary wavelengths out of the WDM light from any of the (K+M_drop−1) output ports at the minimum, and K pieces of (K+M_add−1)-input 1-output multiplexers provided for the K pieces of output optical transmission paths and having (K+M_add−1) input ports at the minimum and one output port. To one of the 1×(K+M_drop−1) wavelength selecting switches, one of the input ports of (K−1) pieces of (K+M_add−1)-input 1-output multiplexers provided for the (K−1) pieces of output optical transmission paths different from the input optical transmission path for which the 1×(K+M_drop−1) wavelength selecting switch is provided is connected. The add wavelength output means has M_add pieces of add wavelength multiplexing and selecting units each of which is connected to one of the input ports of the K pieces of (K+M_add−1)-input 1-output multiplexers, multiplexes the add signal light of N wavelengths at the maximum, and selectively outputs add signal light of one or more arbitrary wavelengths to any of the K pieces of (K+M_add−1)-input 1-output multiplexers. In addition, the drop wavelength output means has M_drop pieces of drop wavelength multiplexing and selecting units each of which is connected to one of the output ports of the K pieces of (K+M_drop−1) wavelength selecting switches, multiplexes outputs of the K pieces of 1×(K+M_drop−1) wavelength selecting switches, and selectively outputs drop signal light having arbitrary wavelength.

Further, the add wavelength multiplexing and selecting unit can be configured, for example, by comprising an add signal light multiplexer for multiplexing the add signal light, and a 1×K wavelength selecting switch connected to one of the input ports of each of the K pieces of (K+M_add−1)-input 1-output multiplexer and selectively outputting signal light having one or more arbitrary wavelengths included in output light of the add signal light multiplexer to one of the input ports of each of the K pieces of (K+M_add−1)-input 1-output multiplexers.

Moreover, the drop wavelength multiplexing and selecting unit can be configured by comprising a drop signal light multiplexer connected to each of the output ports of the K pieces of 1×(K+M_drop−1) wavelength selecting switches and multiplexing outputs of the K pieces of 1×(K+M_drop−1) wavelength selecting switches, and a wavelength selector for selectively outputting signal light having arbitrary wavelength included in output light of the drop signal light multiplexer.

Moreover, the optical transmitting apparatus is an apparatus to which WDM light of the maximum N wavelengths (where N denotes an integer of 2 or larger) is input from each of K pieces of (where K denotes an integer of 2 or larger) input optical transmission paths and which outputs WDM light of the maximum N wavelengths to each of the K pieces of output optical transmission paths. When the minimum integer of integers M satisfying the relation of $M \geq I\_add/N$ where wavelength of add signal light to be output to any of the output optical transmission paths is set as I_add and wavelength of drop signal light to be dropped from any of the input optical transmission paths is set as I_drop is M_add, and the minimum integer of integers M' satisfying the relation of $M' \geq I\_drop/N$ is M_drop, the optical path switching means comprises K pieces of 1×K wavelength selecting switches provided for the K pieces of input optical transmission paths and selectively outputting signal light of one or more arbitrary wavelengths out of the WDM light from any of K output ports as the minimum, and K pieces of K-input 1-output multiplexers provided for the K pieces of output optical transmission paths and having K input ports at the minimum and one output port. To one 1×K wavelength selecting switch, one of the input ports of (K−1) pieces of K-input 1-output multiplexers provided for the (K−1) pieces of output optical transmission paths different from the input optical transmission path for which the 1×K wavelength selecting switch is provided is connected. The add wavelength output means has M_add pieces of add wavelength multiplexing and selecting units each having K pieces of output ports at the minimum, multiplexing the add signal light of the N wavelengths at the maximum, and selectively outputting add signal light having arbitrary one or more wavelengths from the output ports, and K pieces of M_add-input 1-output multiplexers each having M_add pieces of input ports and one output port. Each of the input ports of the M_add-input and 1-output multiplexers is connected to one of the output ports of the M_add pieces of add wavelength multiplexing and selecting units, and the output port of the M_add-input 1-output multiplexer is connected to one of the input ports of the K-input 1-output multiplexer. In addition, the drop wavelength output means has K pieces of 1×M_drop wavelength selecting switches each of which is connected to one of the output ports of the 1×K wavelength selecting switch and outputting signal light having one or more arbitrary wavelengths out of output light from the 1×K wavelength selecting switch from any of the M_drop pieces of output ports at the minimum, and M_drop pieces of drop wavelength multiplexing and selecting units each connected to one of output ports of the K pieces of 1×M_drop wavelength selecting switches, multiplexing outputs of the K pieces of 1×M_drop wavelength selecting switches, and selectively outputting drop signal light having arbitrary wavelength.

The add wavelength multiplexing and selecting unit can be configured by comprising an add wavelength multiplexer for multiplexing the add signal light, and a 1×K wavelength selecting switch connected to one of the input ports of each of the K pieces of the M_add-input 1-output multiplexers and selectively outputting signal light having one or more arbitrary wavelengths included in output light of the add wavelength multiplexer to one of the input ports of each of the K pieces of M_add-input 1-output multiplexers.

On the other hand, the drop wavelength multiplexing and selecting unit can be configured, for example, by comprising a K-input 1-output drop wavelength multiplexer for multiplexing outputs from one of the output ports of each of the K pieces of 1×M_drop wavelength selecting switches, and a wavelength selector for selectively outputting signal light having arbitrary wavelength included in output light of the drop signal light multiplexer.

Next, the method of adding a path for an optical transmitting apparatus of the present invention is a method in which the number of transmission paths is increased by connecting an optical switch module having wavelength selecting switches of the number required in accordance with the number of transmission paths to be increased to an optical transmitting apparatus having optical path switching means by using an idle port of the wavelength selecting switches in the optical path switching means, and the optical path switching means is connected to a plurality of transmission paths for transmitting WDM light and is constructed by a combination of a plurality of wavelength selecting switches to output signal light having any wavelength included in the WDM light from a transmission path to another transmission path.

Preferably, the wavelength selecting switch in the optical path switching means is preliminarily provided with an idle port for adding at least one path.

Further, the number of transmission paths can be further increased by preliminarily providing the wavelength selecting switch in the optical switch module with at least one idle port for adding a path so as to prepare for further increase in the number of transmission paths, and connecting another optical switch module by using the idle port.

Further, the optical switch module may have one or more 1-input k-output (where k denotes an integer of 2 or larger) wavelength selecting switches and one or more k-input 1-output wavelength selecting switch, the input port of said 1-input k-output wavelength selecting switch and the output port of said k-input 1-output wavelength selecting switch may be connected to the idle port of the wavelength selecting switch in the optical wavelength selecting means or an add transmission path, and at least one of output ports of said 1-input k-output wavelength selecting switch and at least one of input ports of said k-input 1-output wavelength selecting switch may be set as idle ports for connecting said another optical switch module.

Further, the optical switch module may be provided with an optical amplifier for amplifying signal light sent via a plurality of wavelength selecting switches.

Moreover, the optical transmitting apparatus of the present invention is an apparatus having optical path switching means connected to a plurality of transmission paths for transmitting WDM light and constructed by combining a plurality of wavelength selecting switches to output signal light having any wavelength included in the WDM light from a transmission path to another transmission path. The optical transmitting apparatus is characterized in that the wavelength selecting switch in the optical path switching means is provided with an idle port for connecting an optical switch module constructed by including wavelength selecting switches of the number required in accordance with the number of transmission paths to be added.

The optical switch module for adding a path for an optical transmitting apparatus of the present invention is an apparatus having optical path switching means connected to a plurality of transmission paths for transmitting WDM light and constructed by combining a plurality of wavelength selecting switches to output signal light having any wavelength included in the WDM light from a transmission path to another transmission path, and comprises wavelength selecting switches of the number necessary in accordance with the number of transmission paths to be added. The optical switch module is characterized in that the wavelength selecting switches are connected idle ports of the wavelength selecting switches in the optical path switching means in the optical transmitting apparatus.

The wavelength selecting switch in the optical switch module may be provided with an idle port for adding a path so as to prepare for further increase in the number of transmission paths, and connecting another optical switch module by using the idle port.

Further, the optical switch module for adding a path to an optical transmitting apparatus comprises one or more 1-input k-output wavelength selecting switches (where k denotes an integer of 2 or larger) and k-input 1-output wavelength selecting switches as the wavelength selecting switch in the optical switch module. The optical switch module is characterized in that the input port of said 1-input k-output wavelength selecting switch and the output port of said k-input 1-output wavelength selecting switch may be connected to the idle port of the wavelength selecting switch in the optical wavelength selecting means in the optical transmitting apparatus or an add transmission path, and at least one of the output ports of said 1-input k-output wavelength selecting switch and at least one of the input ports of said k-input 1-output wavelength selecting switch may be provided as idle ports for connecting said another optical switch module.

According to the invention, the following effects and advantages are obtained.

(1) Since signal lights having one or more wavelengths included in WDM light input from any of input ports are selected and output from any of output ports in the optical path switching means, a transmission path of signal light having an arbitrary wavelength included in the WDM light from a transmission path can be changed to a different path without demultiplexing the WDM light every wavelength unlike the conventional technique, and the number of ports necessary for the optical path switching means can be largely reduced.

(2) By the add wavelength output means, add signal lights of plural wavelengths are multiplexed and an add signal light having one or more wavelengths included in the multiplexed signal light can be selectively connected as signal light to be multiplexed to the WDM light to any output light transmission path to any of output ports of the optical path switching means. By the drop wavelength output means, signal light having one or more wavelengths included in WDM light to be input to any of input ports of the optical path switching means is selectively received and multiplexed and signal light included in the multiplexed signal light can be selectively output on the wavelength unit basis. Thus, the number of optical wires (the number of fiber patch cords) necessary in the optical transmitting apparatus can be largely reduced as compared with the conventional technique.

(3) Further, each of the number of optical wires (input ports of a multiplexer) occupied by add signal light for the output ports of the optical path switching means and optical wires (output ports of a wavelength selection switch) occupied by drop signal light for the input ports of the optical path switching means can be set to one at the minimum irrespective of the wavelength multiplexing number of the WDM light. Consequently, even when the wavelength multiplexing number increases, an optical device such as the multiplexer having the necessary number of ports can be sufficiently realized by the present technical level and, moreover, it largely contributes to realization of the optical transmitting apparatus.

Specifically, by allocating one of the output ports of the optical path switching means irrespective of the number of output ports of the drop signal light, a path can be switched and drop-add can be performed. Therefore, without increasing the number of output ports of the optical path switching means, the number of ports of the drop signal light can be increased.

(4) In the case where future increase in the number of transmission paths and the number of drop/add signal light wavelengths is expected, by setting the number of output ports of the wavelength selection switch and the number of input ports of a multiplexer to be larger than K, for example, by setting the number of output ports of the wavelength selection switch and the number of input ports of the multiplexer to (K+K') ports (that is, by providing K' pieces of spare ports), the transmission path number can be increased by K' pieces or the drop/add signal light can be increased by N×K' pieces. That is, future functional expansion of the apparatus can be addressed by the spare port number overwhelmingly smaller than that of the conventional configuration.

(5) Further, each of the number of output ports of a wavelength selection switch provided for each of a plurality of transmission paths and the number of input ports of a multiplexer can be set to constant (K) without depending on the number of drop/add signal light wavelengths. Consequently, drop/add signal light can be increased without exerting an influence on, at least, signal lights related to a path change. Even if the number of drop/add signal light wavelengths increase, each of the number of output ports of the wavelength selection switch and the number of input ports of the multiplexer can be suppressed to the number K of transmission paths. Therefore, the optical devices each having the necessary number of ports can be sufficiently realized by the present technical level and, moreover, it largely contributes to realization of the optical transmitting apparatus.

(6) By connecting an optical switch module constructed by wavelength selection switches of the necessary number according to the number of transmission paths to be increased to an optical transmitting apparatus having optical path switching means constructed by combining a plurality of wavelength selection switches by using an idle port of the wavelength selection switch in the optical path switching means, without preparing spare optical devices such as wavelength selection switches and the enormous number of spare ports which are necessary for a predicted final form from initial introduction, the number of transmission paths can be increased (upgrading can be performed). Thus, the initial introduction cost of the optical transmitting apparatus can be largely reduced, and free increase in the number of transmission paths can be flexibly addressed without exerting an influence on the transmission of existing signal lights (namely, without service interruption).

(7) Particularly, by preliminarily providing at least one idle port for adding a path for the wavelength selection switch in the optical path switching means, while suppressing the number of input/output ports necessary for the optical path switching means in association with increase in the number of transmission paths to the minimum, increase in the number of transmission paths can be realized. By providing at least one idle port for adding a path in advance for further increase in the number of transmission paths for the wavelength selection switch in the optical switch module and connecting another optical switch module by using the idle port, the number of transmission paths can be easily increased.

(8) By providing the optical switch module with an optical amplifier for amplifying signal light passing through a plurality of wavelength selection switches, an optical loss of the signal light passing through the wavelength selection switches in multiple stages due to addition of the optical switch module can be compensated. Therefore, even when the number of transmission paths is increased due to addition of the optical switch module, necessary transmission characteristics of the signal light can be assured.

BRIEF DESCRIPTION OF THE DRAWINGS

FIG. 9 is a diagram for explaining modes (POADM, ROADM, and DOADM) of the configuration of the optical cross connect apparatus (OADM).

FIG. 10A is a block diagram showing an example of the configuration of an add part and a drop part in the case of the POADM.

FIG. 10B is a block diagram showing an example of the configuration of an add part and a drop part in the case of the DOADM.

FIGS. 11A to 11C are diagrams showing images of an optical node in-service upgrading method (method of increasing the number of paths) according to a second embodiment of the invention.

FIGS. 14A to 14C are block diagrams showing a modification of the second embodiment of the invention.

DESCRIPTION OF THE PREFERRED EMBODIMENTS

A. First Embodiment

Figure 1:
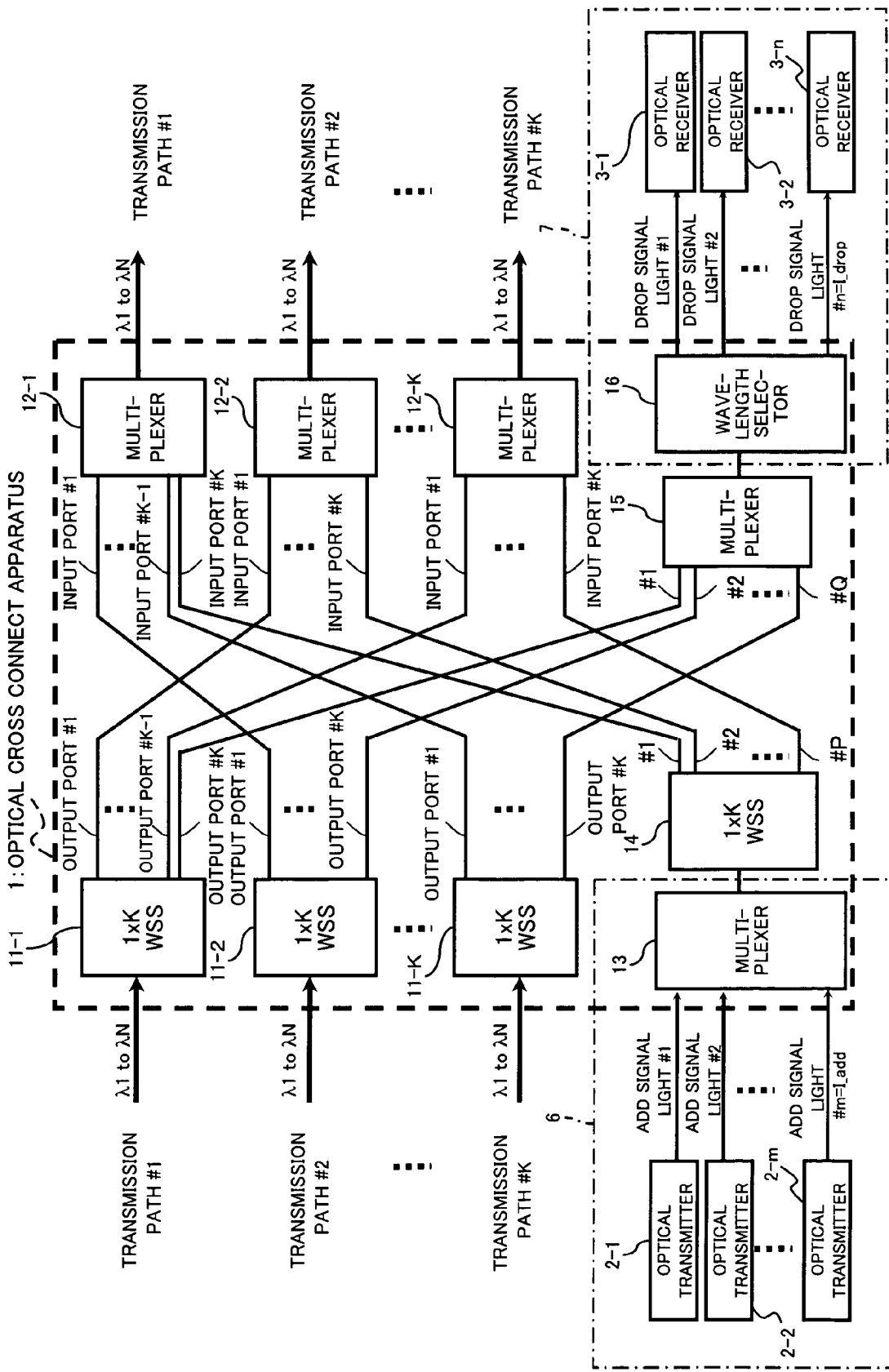
FIG. 1 is a block diagram showing the configuration of an optical cross connect apparatus (optical transmitting apparatus) of a first embodiment of the invention.

FIG. 1 is a block diagram showing the configuration of an optical cross connect apparatus (optical transmitting apparatus) of a first embodiment of the invention. An optical cross connect apparatus (hereinbelow, also called a node) 1 shown in FIG. 1 is an apparatus to which wavelength division multiplex signal lights (WDM lights) of maximum N wavelengths ($\lambda 1$ to $\lambda N$, where N denotes an integer of 2 or larger) are input from K pieces (K: an integer of 2 or larger) of transmission paths (input light transmission paths) #1 to #K and which can output WDM lights of maximum N wavelengths to each of K pieces of transmission paths (output light transmission paths) #1 to #K. When the number of add signal light wavelengths to be output (added) to any of the output light transmission paths #1 to #K are m (=I_add), the number of drop signal light wavelengths to be dropped from any of the input light transmission paths #1 to #K are n (=I_drop), the minimum integer of integers M satisfying the relation of M≧I_add/N is M_add, and the minimum integer of integers M' satisfying the relation of M'≧I_drop/N is M_drop, the optical cross connect apparatus 1 is constructed by the following components.

The optical cross connect apparatus 1 is constructed by: K pieces of 1×P wavelength selection switches (WSS) 11-1 to 11-K each having one input port and output ports of the number which is P at the minimum (P=K+M_drop−1) provided for the transmission paths (input transmission paths) #1 to #K; K pieces of (Q-input 1-output) multiplexers 12-1 to 12-K each having minimum Q (=K+M_add−1) input ports and one output port provided for K pieces of output optical transmission paths #1 to #K; M_add pieces of (m-input 1-output) multiplexers 13 for optical transmitters 2-1 to 2-m of the number corresponding to the number of insertion (add) signal light wavelengths m (=1_add); M_add pieces of (1×K) wavelength selection switches 14 provided on the output side of the multiplexers 13 and each having one input port and K output ports (output ports #1 to #K); M_drop pieces of (K-input 1-output) multiplexers 15 for the optical receivers 3-1 to 3-n of the number corresponding to the number of drop signal light wavelengths n (=1_drop); and M_drop pieces of wavelength selectors 16 which are provided on the output side of the multiplexers 15, whose outputs are connected to the optical receivers 3-1 to 3-n, and each having one input port and n output ports.

FIG. 1 shows the case where the number of add signal wavelengths m (=I_add)≧wavelength multiplexing number N and the number of drop signal light wavelengths n (=I_drop)≧wavelength multiplexing number N, that is, M_add=M_drop=1 and P=Q=K. In the following, description will be given on the preconditions.

Each 1×K wavelength selection switch (optical path switching means) 11-i (where i=1 to K) (hereinbelow, simply described as a 1×K wavelength selection switch 11 in the case where the switches are not distinguished from each other) can selectively output signal light having one or more arbitrary wavelengths from signal lights having wavelengths $\lambda 1$ to $\lambda N$ constructing WDM signal light input from the transmission path #i to any of the output ports #1 to #K. Each of the output ports #1 to #K is connected to one of input ports of the K−1 pieces of multiplexers 12-1 to 12-K corresponding to different paths (including the paths to the optical receivers 3-1 to 3-n) except for the same transmission path #i and input ports of the multiplexer 15 provided for the optical receivers 3-1 to 3-n via an optical fiber (fiber patch cord). For example, when attention is paid to the 1×K wavelength selection switch 11-1 positioned in the highest stage in FIG. 1, the output ports #1 to #K−1 are connected to the input ports #1 of the different multiplexers 12-2 to 12-K except for the multiplexer 12-1 corresponding to the same path #1, and the remaining one output port #K is connected to the input port #1 of the multiplexer 15. The other switches are connected similarly.

Figure 2:
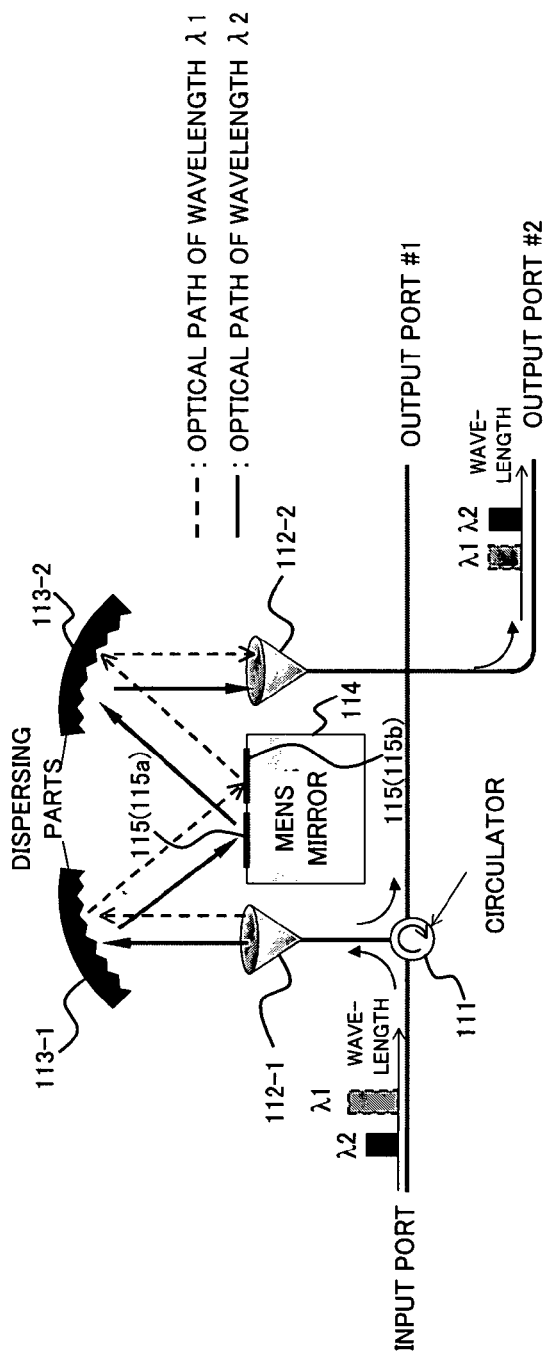
FIG. 2 is a block diagram showing an example of the configuration of a wavelength selection switch illustrated in FIG. 1.
Figure 3:
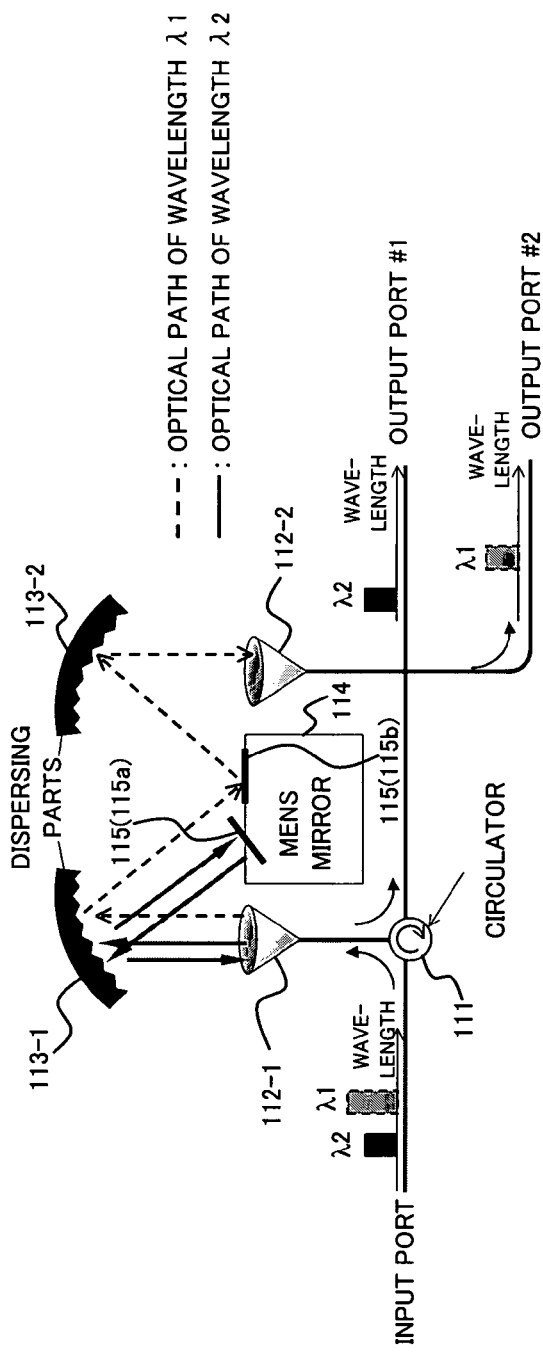
FIG. 3 is a block diagram showing an example of the configuration of the wavelength selection switch illustrated in FIG. 1.

Concretely, for example, as shown in FIGS. 2 and 3, the wavelength selection switch 11-i is constructed by a space optical switch including a circulator 111, an input collimator 112-1, an output collimator 112-2, dispersing parts 113-1 and 113-2, and an MEMS (Micro Electro Mechanical Systems) mirror unit 114 on which tilt mirrors 115 of the number corresponding to the maximum wavelength number N included in the input WDM light. The WDM light input to the input-side dispersing part 113-1 via the circulator 111 is dispersed on the wavelength unit basis, the dispersed light is emitted to the different tilt mirrors 115 (115*a* and 115*b*), the tilt angle (mirror angle) of the tilt mirror 115 is controlled every wavelength to change the reflecting direction of incident light (optical path), thereby enabling the destination (output port) to be selected every wavelength.

For example, in the case where K=2, specifically, in the case of the 1×2 wavelength selection switch 11-*i* and the wavelength multiplexing number N=2, the WDM light incident from an input port enters from the circulator 111 to the input collimator 112-1 and is converted to collimate light by the input collimator 112-1, the collimate light is incident on the dispersing part 113-1, dispersed to signal lights having wavelengths $\lambda 1$ and $\lambda 2$ by the dispersing part 113-1, and the signal lights are incident on the different tilt mirrors 115*a* and 115*b*. When the mirror angles of the tilt mirrors 115*a* and 115*b* are controlled so that the signal lights are incident on the dispersing part 113-2, as shown by broken lines (the optical path of the wavelength $\lambda 1$) and solid lines (the optical path of the wavelength $\lambda 2$) in FIG. 2, the signal lights having the wavelengths $\lambda 1$ and $\lambda 2$ are output (reflected) by the tilt mirrors 115*a* and 115*b* to the dispersing part 113-2 on the output side and multiplexed by the multiplexer 113-2, and the resultant is output from the output port #2 via the output collimator 112-2.

On the other hand, for example, as shown in FIG. 3, the mirror angle of the tilt mirror 115*a* corresponding to the wavelength $\lambda 2$ is controlled so that the signal light having the wavelength $\lambda 2$ returns to the input-side dispersing part 113-1, and the mirror angle of the tilt mirror 115*b* is set so as to make the signal light having the wavelength $\lambda 1$ go out to the output-side dispersing part 113-2 in a manner similar to the case of FIG. 2. The signal light having the wavelength $\lambda 2$ enters the dispersing part 113-1, input collimator 112-1, and circulator 111 in order and goes out from the output port #1. The signal light having the wavelength $\lambda 2$ enters the dispersing part 113-1 and the output collimator 112-2 in order and goes out from the output port #2.

By the principle as described above, the wavelength selection switch 11-*i* of the embodiment can selectively output signal light having one or more arbitrary wavelengths included in input WDM light to any of the output ports #1 to #K.

In FIG. 1, each multiplexer 12-*i* (hereinbelow, simply expressed as multiplexer 12 when the multiplexers are not distinguished from each other) multiplexes signal lights having different wavelengths which are input from the different wavelength selection switches 11-*i* and 14 except for the wavelength selection switch 11-*i* corresponding to the same transmission path #*i*, that is, which are input from different paths (including paths from the optical transmitters 2-1 to 2-*m*) and outputs the multiplexed signal light to the transmission path #*i*.

Further, the multiplexer 13 multiplexes add signal lights input from the optical transmitters 2-1 to 2-*m* (hereinbelow, simply expressed as optical transmitter 2 when the optical transmitters are not distinguished from each other) and outputs the resultant to the 1×K wavelength selection switch 14. The 1×K wavelength selection switch 14 selectively outputs signal lights having one or more arbitrary wavelengths from the add signal lights (WDM lights) input from the multiplexer 13 to the output ports #1 to #K. As shown in FIG. 1, each of output ports #1 to #K is connected to one (input port #K) of the input ports of the multiplexers 12-*i* corresponding to the different transmission paths #I via a fiber patch cord. The optical transmitters 2 and the multiplexer 13 construct an add part 6 as shown in FIG. 1.

Each of the input ports #1 to #K of the multiplexer (drop means) 15 is connected to the output port (#K) as one of the output ports #1 to #K of each of the 1×K wavelength selection switches 11-*i* corresponding to the different transmission paths #*i* via a fiber patch cord, and the multiplexer 15 multiplexes signal lights (drop signal lights) input from the different 1×K wavelength selection switches 11-*i*, that is, from different transmission paths #*i*.

Figure 4:
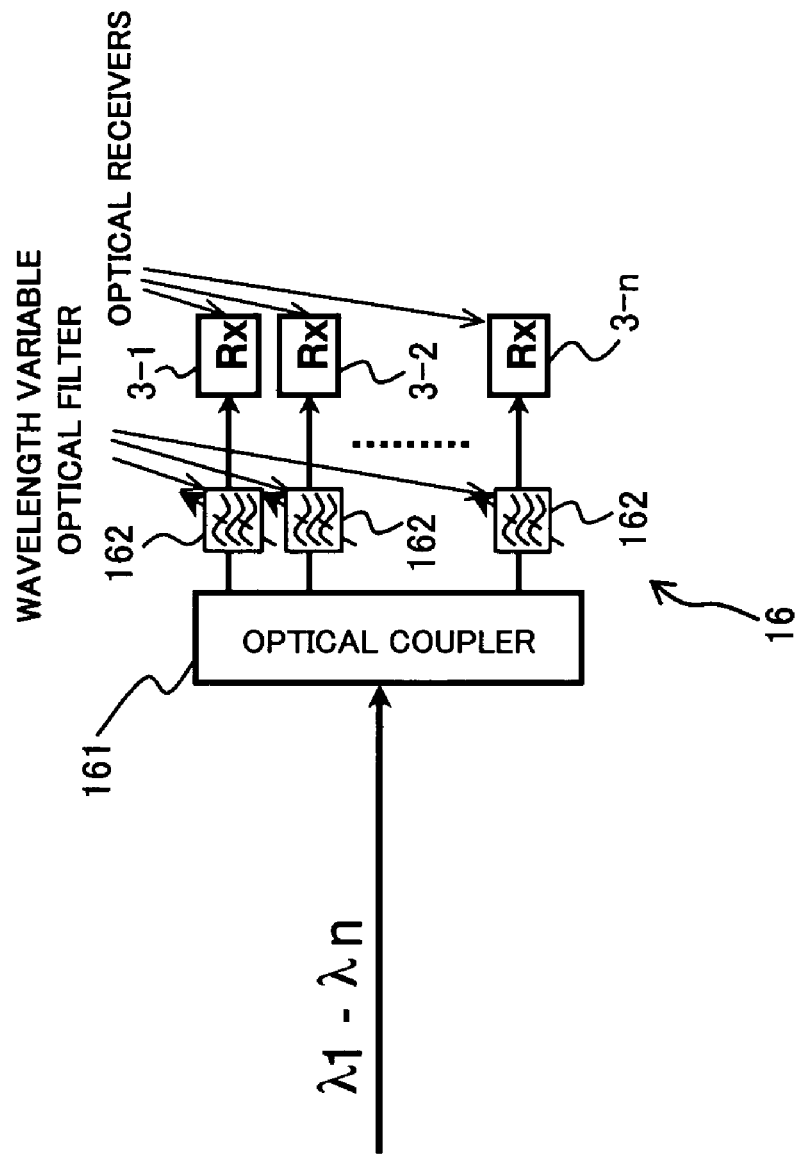
FIG. 4 is a block diagram showing an example of the configuration of a wavelength selector illustrated in FIG. 1.

The wavelength selector 16 selectively outputs, as drop signal light, signal light having an arbitrary wavelength in WDM light input from the multiplexer 15 to any of the output ports, which is received by any of the optical receivers 3-1 to 3-*n* (hereinbelow, simply expressed as optical receiver 3 when they are not distinguished from each other). The optical receivers 3 and the wavelength selector 16 construct a drop part 7 as shown in FIG. 1. For example, as shown in FIG. 4, the wavelength selector 16 can be realized by dropping the power of the input WDM light by an optical coupler 161 and passing only signal light having a wavelength to be received by corresponding one of the optical receivers 3-1 to 3-*n* via a wavelength variable optical filter 162 provided for each of the optical receivers 3-1 to 3-*n*.

That is, by providing the 1×K wavelength selection switch 11 having one input port and having K output ports for each of K pieces of the input transmission paths #1 to #K, providing one multiplexer 12 having K input ports and one output port for each of the output transmission paths #1 to #K, and connecting (K−1) pieces of the multiplexers 12 except for one multiplexer 12 having the same path as that of one 1×K wavelength selection switch 11, the optical cross connect function (optical cross connect means) capable of outputting all of input signal lights to all of the output transmission paths #1 to #K except for the same path is realized.

For the add signal lights #1 to #m, the multiplexer 13 for multiplexing the add signal lights #1 to #m and the 1×K wavelength selection switch 14 are provided and an output of the switch 14 is connected to the multiplexers 12 provided for the output transmission paths #1 to #K, thereby realizing an add function (add wavelength output means) capable of outputting add signal lights from all of the optical transmitters 2 to arbitrary output transmission paths #1 to #K. By providing the multiplexer 15 having K input ports in correspondence with the output ports which are not connected to the multiplexers 12 provided for the output transmission paths #1 to #K out of the output ports of the 1×K wavelength selection switches 12 provided for the input transmission paths #1 to #K and the wavelength selector 16 for dropping a drop wavelength, a drop function (drop wavelength output means) capable of receiving signal lights (drop signal lights #1 to #n) having arbitrary wavelengths input from arbitrary one of the input transmission paths #1 to #K by an arbitrary optical receiver 3 is realized.

With the above-mentioned configuration, in the optical cross connect apparatus 1 of the embodiment shown in FIG. 1, the transmission path of WDM signal light having N wavelengths at the maximum to be input/output from/to K pieces of transmission paths #1 to #K is switched on the wavelength unit basis, the add signal lights #1 to #m having the m wavelengths at the maximum from the optical transmitters 2-1 to 2-*m* can be added to an arbitrary transmission path #*i*, and the signal lights #1 to #n having the n wavelengths at the maximum can be dropped from the WDM light on an arbitrary transmission path #*i* and received by the arbitrary optical receivers 3-1 to 3-*n*.

Figure 5:
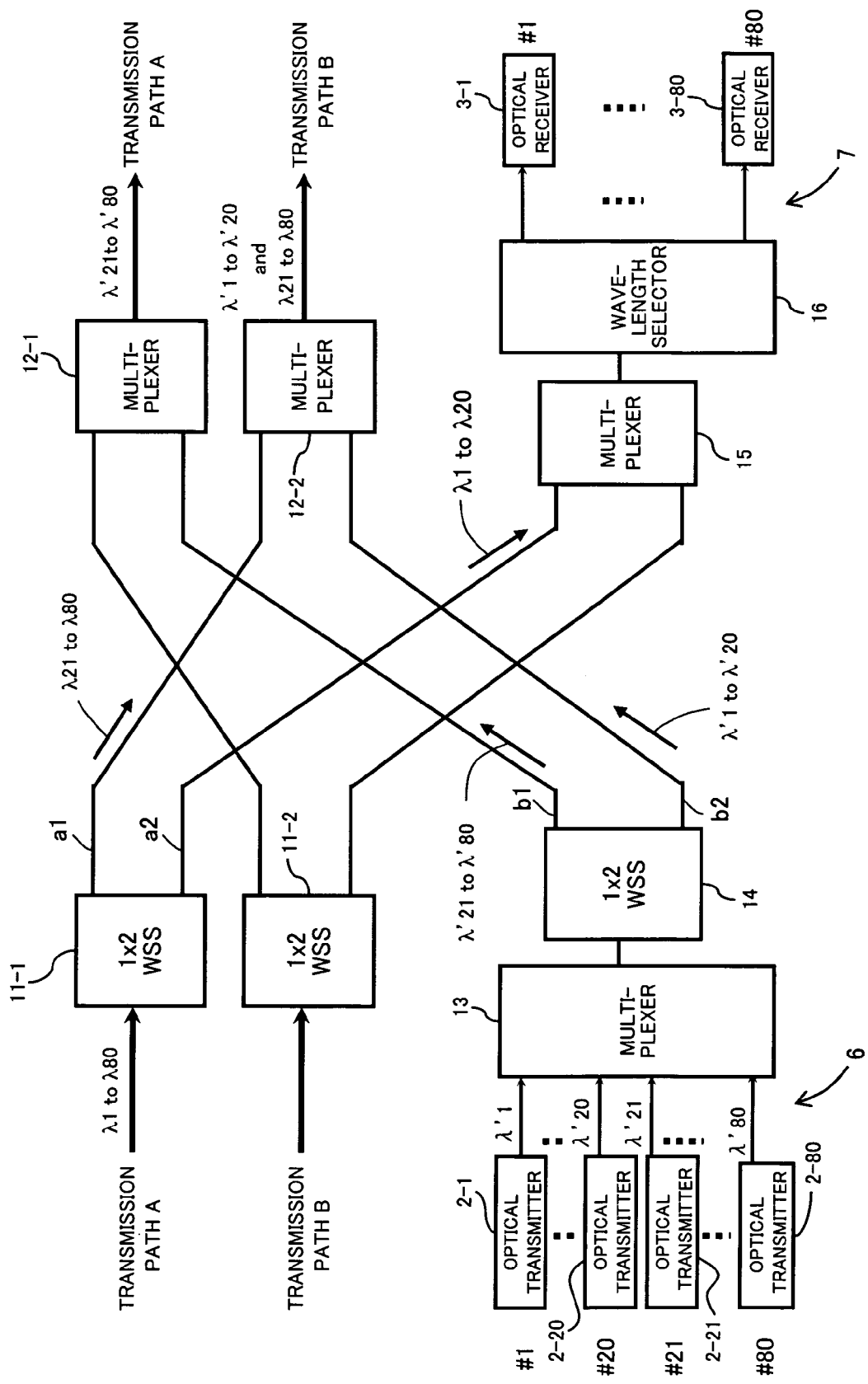
FIG. 5 is a block diagram showing the configuration in the case where the optical cross connect apparatus illustrate in FIG. 1 has the number of transmission paths K=2, the wavelength multiplexing number N=80, the number of add signal light wavelengths m=80, and the number of drop signal light wavelengths n=80.

Now, for example, as shown in FIG. 5, the case will be examined where transmission path number K=2, wavelength multiplexing number N=80, the number of add signal light wavelength m=80, and the number of drop signal light wavelength n=80 (that is, M_add=M_drop=1, P=Q=K=2), that is, the case where, in the optical cross connect apparatus 1 which inputs/outputs WDM light having 80 wavelengths from/to each of the two transmission paths A and B and capable of dropping/adding signal lights having 80 wavelengths, wavelengths λ1 to λ80 are dropped from signal lights having the wavelength λ1 to λ80 input from the transmission path A, the path of wavelengths λ21 to λ80 is changed to the transmission path B, wavelengths λ'1 to λ'20 of add signal light are output to the transmission path B, and wavelengths λ'21 to λ'80 are output to the transmission path A.

In this case, the signal lights having the wavelengths λ1 to λ20 in the WDM light input from the path A to the 1×2 wavelength selection switch 11-1 is output from an output port a1 connected to the multiplexer 12-2 corresponding to the transmission path B, and the remaining wavelengths λ21 to λ80 are output as drop signal light from the other output port a2. The drop signal light output from the output port a2 is multiplexed on other drop signal light from the 1×2 wavelength selection switch 11-2 corresponding to the transmission path B in the multiplexer 15, and the wavelength is selected and output by the wavelength selector 16 and received by desired one of the optical receivers 3-1 to 3-80.

On the other hand, signal light output from the output port a1 of the 1×2 wavelength selection switch 11-1 is output to the transmission path B via the multiplexer 12-2. Add signal lights (λ'1 to λ'80) are multiplexed by the multiplexer 13, the resultant is input to the 1×2 wavelength selection switch 14 where the signal lights having the wavelengths λ'1 to λ'20 are output from the output port b2 connected to the multiplexer 12-2 corresponding to the transmission path B, and the signal lights having the wavelengths λ'21 to λ'80 are output from the output port b1 connected to the multiplexer 12-1 corresponding to the transmission path A. In such a manner, the signal lights having the wavelengths λ'1 to λ'20 can be output (added) to the transmission path B, and the signal lights having the wavelengths λ'21 to λ'80 can be output (added) to the transmission path A.

As described above, in the optical cross connect apparatus 1 of the embodiment, to realize the optical cross connect function capable of outputting signal lights from arbitrary one of the input transmission paths #1 to #K to arbitrary one of the output transmission paths #1 to #K, it is sufficient to provide K pieces of wavelength selection switches 11 and K pieces of multiplexers 12 for K pieces of transmission paths. In addition, to realize an add function capable of outputting (adding) an arbitrary add signal light to arbitrary one of the output transmission paths #1 to #K, it is sufficient to provide M_add (=1) piece each of the multiplexer 13 and the wavelength selection switch 14. Further, to realize a drop function enabling signal light of arbitrary one of the input transmission paths #1 to #K to be received by an arbitrary optical receiver 3, it is sufficient to provide M_drop (=1) piece each of the multiplexer 15 and the wavelength selector 16. Thus, the number of optical wires (the number of fiber patch cords) necessary in the optical cross connect apparatus can be reduced largely more than that in the conventional apparatus.

Figure 6:
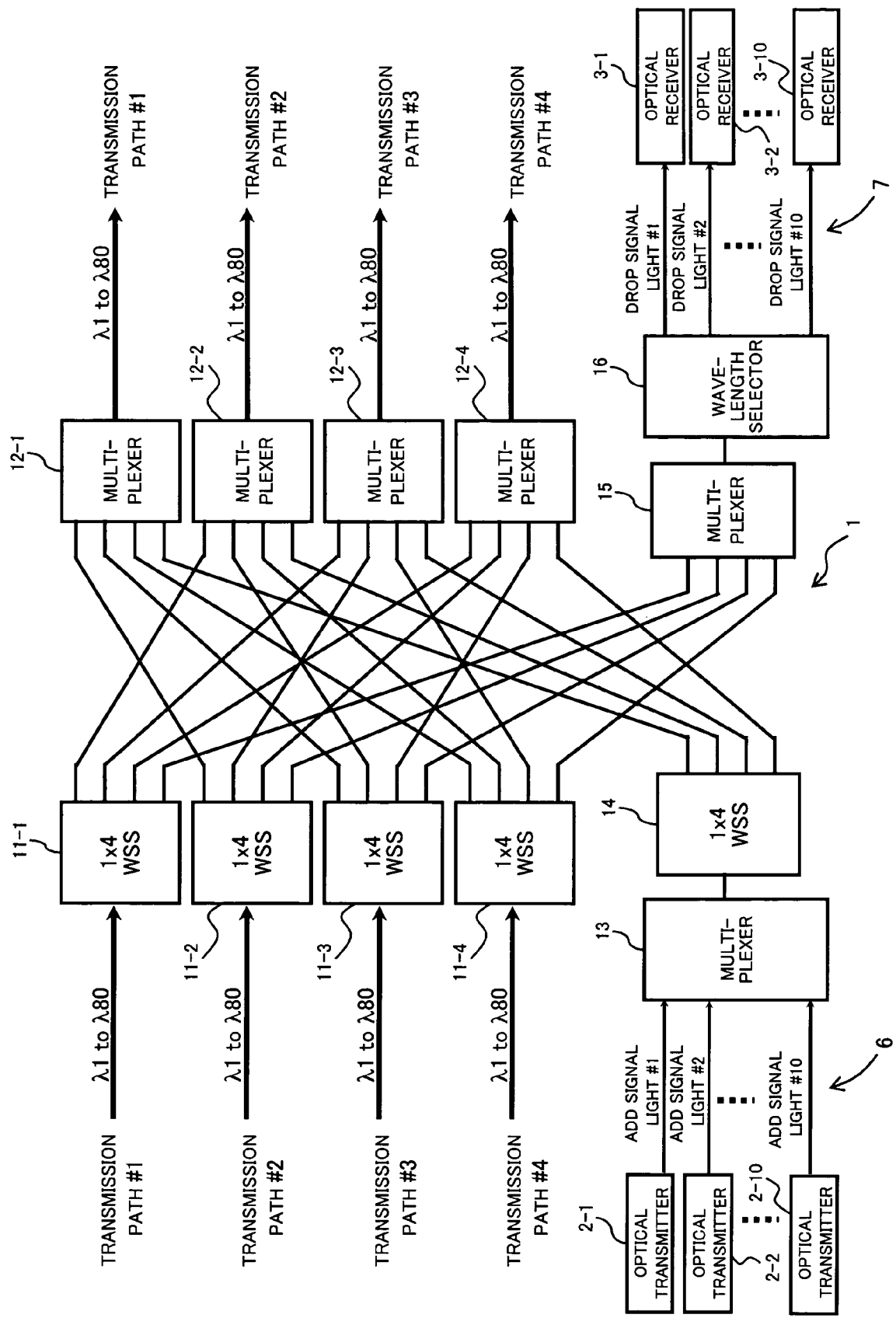
FIG. 6 is a block diagram showing the configuration in the case where the optical cross connect apparatus illustrate in FIG. 1 has the number of transmission paths K=4, the wavelength multiplexing number N=80, the number of add signal light wavelengths m=10, and the number of drop signal light wavelengths n=10.

For example, in the configuration of FIG. 1, when the transmission path number K=4, wavelength multiplexing number N=80, and the number of add/drop signal light wavelengths m=n=10 (that is, M_add=M_drop=1, P=Q=K=4), the configuration of the optical cross connect apparatus 1 is as shown in FIG. 6. The optical cross connect apparatus 1 shown in FIG. 6 is an apparatus having functions equivalent to those of the optical cross connect apparatus 100 using a matrix switch described as the prior art by referring to FIGS. 12 and 14. In the configuration of the embodiment shown in FIG. 6, the number of optical fiber patch cords installed in the node is 42 in total which is only about 6% of the configuration shown in FIG. 12.

In the configurations shown in FIGS. 1 and 5, the number of the input port (optical wire) of each multiplexer 12 or the output port (optical wire) of each wavelength selection switch 11 occupied for add signal light or drop signal light is one irrespective of the wavelength multiplexing number N of the WDM light. Consequently, even when the wavelength multiplexing number N increases, it is unnecessary to change the number of ports necessary for the multiplexer 12. Optical devices having necessary port number at the technical level of the present circumstances can be sufficiently realized. Moreover, the embodiment largely contributes to realization of the optical cross connect apparatus 1.

Further, in the case where future increase in the number of transmission paths K and the number of drop/add signal light wavelengths is predicted, the number of output ports of the wavelength selection switch 11 and the number of input ports of the multiplexer 12 are set to be larger than K. For example, by setting each of the output ports of the wavelength selection switch 11 and the number of input ports of the multiplexer 12 to (K+K') ports (that is, by preparing K' pieces of spare ports), it is possible to increase the number of transmission paths by K' pieces or increase the drop/add signal lights by N×K' pieces or more. In short, future expansion of functions of the apparatus can be addressed by the number of spare ports overwhelmingly smaller than that of the conventional configuration.

Figure 15:
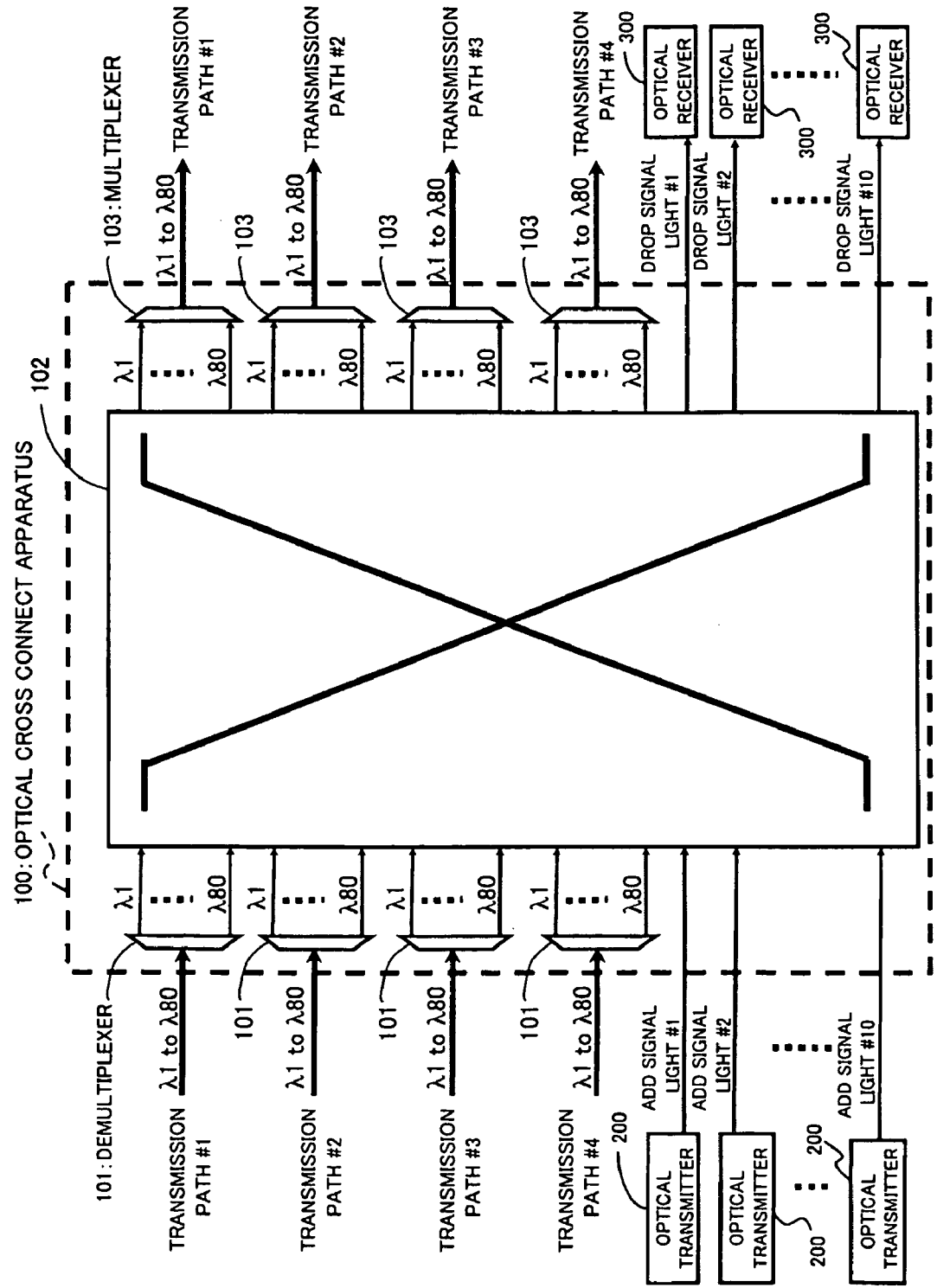
FIG. 15 is a block diagram showing an example of the configuration of a conventional optical cross connect apparatus (optical transmitting apparatus).
Figure 16B:
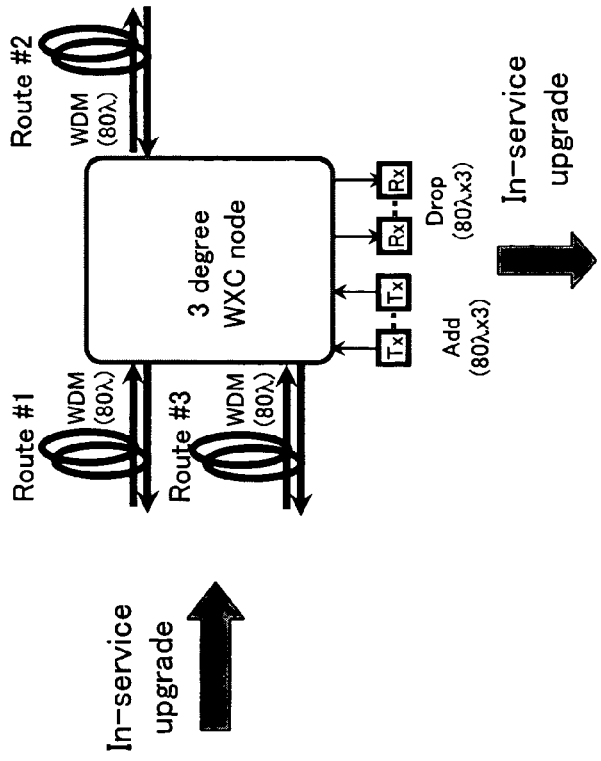
FIGS. 16A to 16C are diagrams for explaining problems of the conventional technique.
Figure 16C:
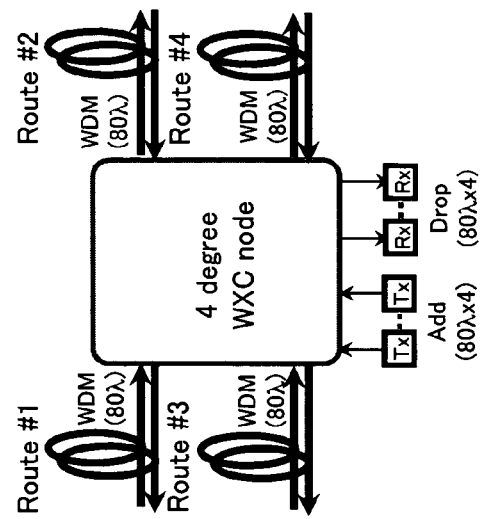
Figure 16A:
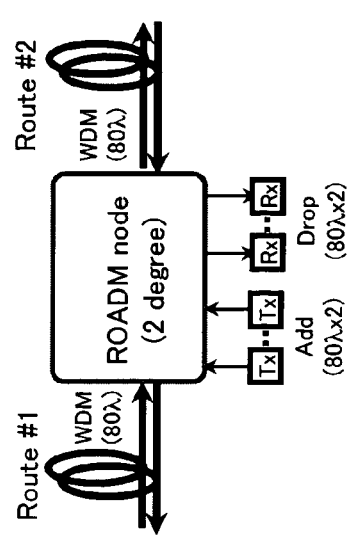
Figure 17:
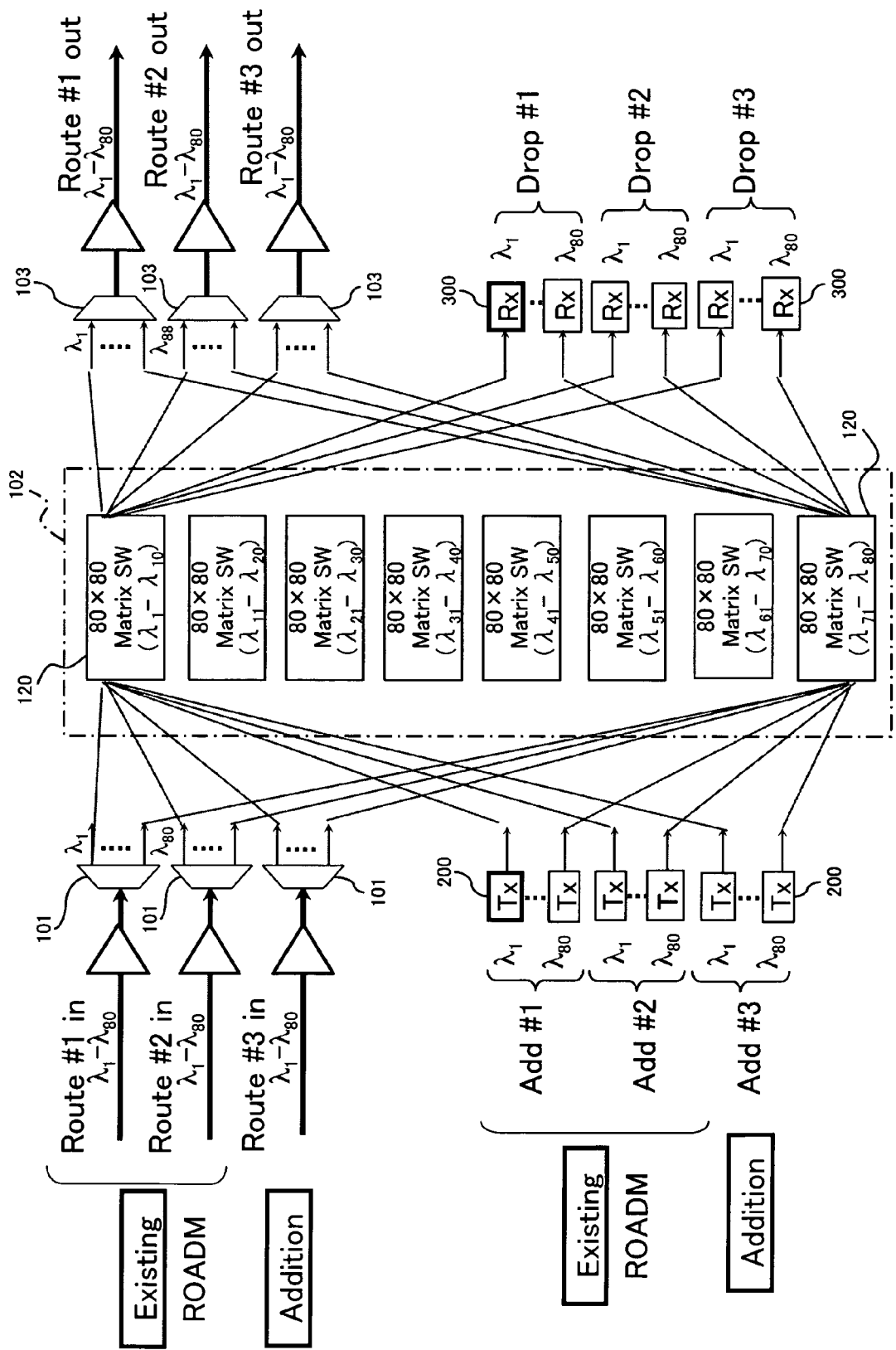
FIG. 17 is a block diagram showing the configuration of the conventional optical cross connect apparatus for explaining the problems of the conventional technique.

For example, when it is expected that one transmission path is increased in the future, in the conventional configuration shown in FIG. 15, 160 input/output ports are necessary as spare ports. In contrast, in the configuration shown in FIG. 6, it is sufficient to provide nine spare ports for each of the output ports of the wavelength selection switch 11 and the input ports of the multiplexer 12. Also with respect to the apparatus expansibility for increase in the number of transmission paths, the optical cross connect apparatus of the embodiment is overwhelmingly advantageous more than the conventional technique.

(A1) Description of First Modification

Figure 7:
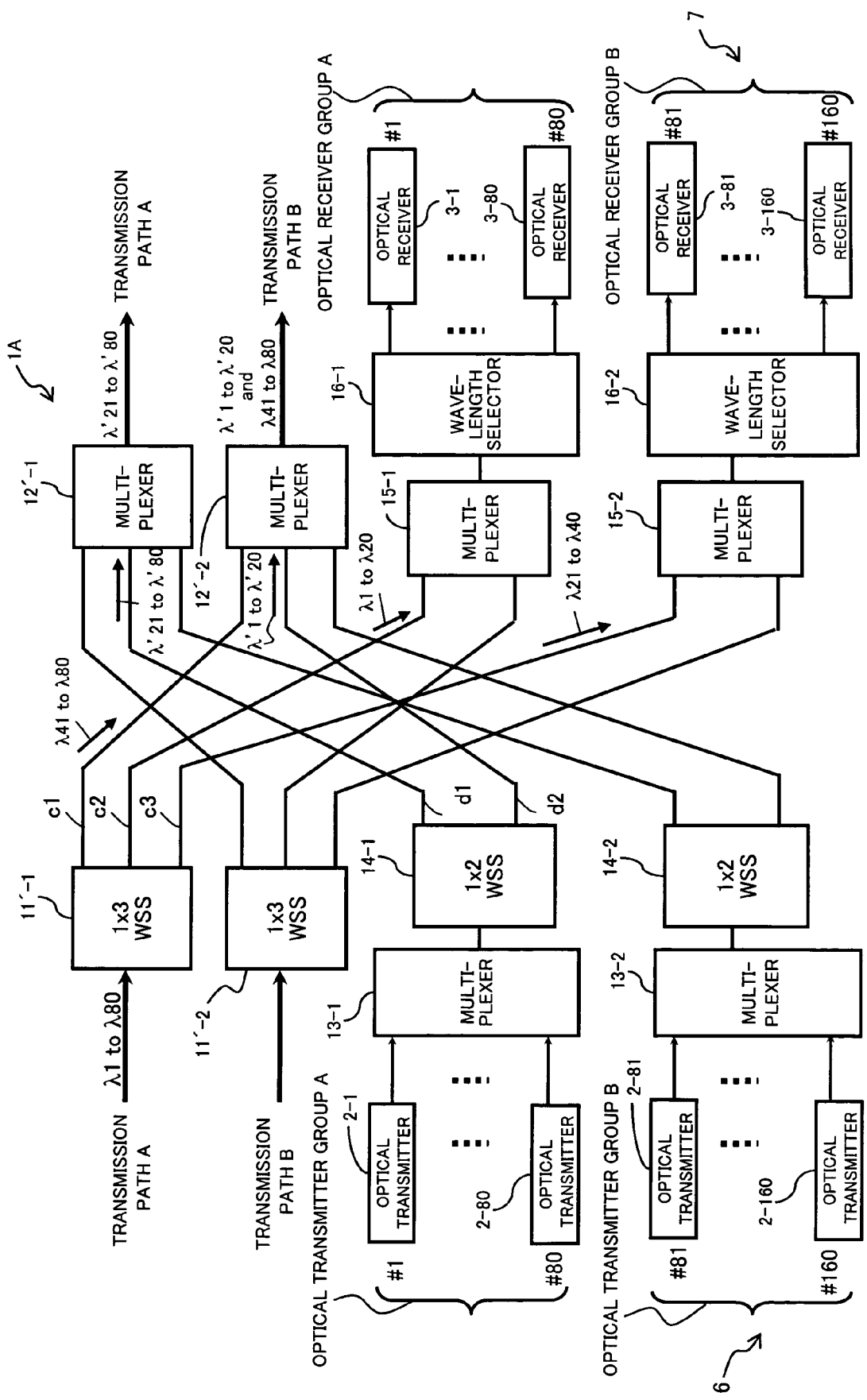
FIG. 7 is a block diagram showing a first modification of the optical cross connect apparatus illustrated in FIG. 1.

FIG. 7 is a block diagram showing a first modification of the optical cross connect apparatus. An optical cross connect apparatus 1A shown in FIG. 7 has a configuration suitable for the case where each of the number of drop/add signal light wavelengths m and n exceeds 80. The configuration relates to the case where the transmission path number K=2, wavelength multiplexing number N=80, the number of add signal light wavelength m=160, and the number of drop signal light wavelength n=160. In other words, the configuration relates to the case where M_add=M_drop=2 and P=Q=3. As shown in FIG. 7, for two input transmission paths A and B (K=2), two 1×3 wavelength selection switches 11'-1 and 11'-2 (K=2) each having one input port and three output ports (P=3) are provided. For two output transmission ports A and B (K=2), two multiplexers 12'-1 and 12'-2 (K=2) each having three input ports (Q=3) and one output port are provided.

For example, for optical transmitters 2-1 to 2-80 (optical transmitter group A) which are the half of optical transmitters 2-1 to 2-160 of 160 wavelengths, a set of a multiplexer 13-1 having 80 input ports and one output port and a 1×K (=2) wavelength selection switch 14-1 is provided. For the remaining optical transmitters 2-81 to 2-160 (optical transmitter group B), similarly, a multiplexer 13-2 having 80 input ports and one output port and a 1×K (=2) wavelength selection switch 14-2 are provided. That is, for the optical transmitters 2-1 to 2-160 of 160 wavelengths, two (M_add=2) multiplexers 13-1 and 13-2 and two 1×K (=2) wavelength selection switches 14-1 and 14-2 are provided.

Similarly, for optical receivers 3-1 to 3-80 (optical receiver group A) which are the half of optical receivers 3-1 to 3-160 of 160 wavelengths, a set of a multiplexer 15-1 having K input ports and one output port and a wavelength selector 16-1 having one input port and 80 output ports is provided. For the remaining optical receivers 3-81 to 3-160 (optical receiver group B), similarly, a multiplexer 15-2 having K input ports and one output port and a wavelength selector 16-2 having one input port and 80 output ports are provided. That is, for the optical receivers 3-1 to 3-160 of 160 wavelengths, two (M_drop=2) multiplexers 15-1 and 15-2 and two wavelength selectors 16-1 and 16-2 are provided.

Each of output ports of one 1×3 wavelength selection switch 11'-1 or 11'-2 is connected to one of input ports of the multiplexers 12'-1, 12'-2, 15-1, and 15-2 corresponding to different transmission paths (including paths to the optical receiver groups A and B) except for the same transmission path A or B via an optical link. Each of output ports of one 1×2 wavelength selection switch 14-1 or 14-2 for add signal light is connected to one of input ports of the multiplexers 12'-1 and 12'-2 corresponding to the different transmission paths A and B.

Also in the modification, the 1×3 wavelength selection switch 11'-1 (11'-2) can selectively output signal light having one or more arbitrary wavelengths out of 80 wavelengths constituting WDM light input from the input transmission path A (B) to any of the three output ports c1, c2, and c3. The multiplexer 13-1 multiplexes add signal lights from the optical transmitters 2-1 to 2-80 constructing the optical transmitter group A, and the 1×2 wavelength selection switch 14-1 can selectively output light having one or more arbitrary wavelengths out of output light of the multiplexer 13-1 to any of output ports d1 and d2.

The multiplexer 13-2 multiplexes add signal lights from optical transmitters 2-81 to 2-160 constructing the optical transmitter group B. The 1×2 wavelength selection switch 14-2 can selectively output light having one or more arbitrary wavelengths out of output light of the multiplexer 13-2 to any of output ports.

The multiplexer 12'-1 is connected to one of three output ports of each of the 1×3 wavelength selection switches 11'-2, 14-1, and 14-2, multiplexes output lights (that is, signal lights from different paths except for the same transmission path A) of the wavelength selection switches 11'-2, 14-1, and 14-2, and transmits the resultant to the output transmission path A. The multiplexer 12'-2 is connected to one of three output ports of each of the 1×3 wavelength selection switches 11'-*i*, 14-1, and 14-2, multiplexes output lights (that is, signal lights from different paths except for the same transmission path B) of the wavelength selection switches 11'-1, 14-1, and 14-2, and transmits the resultant to the output transmission path B.

The multiplexer (dropping means) 15-1 is connected to one of the two output ports of each of the 1×3 wavelength selection switches 11'-1 and 11'-2 corresponding to the input transmission paths A and B and multiplexes output lights (that is, signal lights from different paths A and B) of the wavelength selection switches 11'-1 and 11'-2. The wavelength selector 16-1 selectively outputs signal light having an arbitrary wavelength from the output light of the multiplexer 15-1 to any of the optical receivers 3-1 to 3-80 constructing the optical receiver group A.

The other multiplexer (dropping means) 15-2 is connected to the other one of the two output ports of each of the 1×3 wavelength selection switches 11'-1 and 11'-2 and multiplexes output lights (that is, signal lights from different paths A and B) of the wavelength selection switches 11'-1 and 11'-2. The wavelength selector 16-2 selectively outputs signal light having an arbitrary wavelength from the output light of the multiplexer 15-2 to any of the optical receivers 3-81 to 3-160 constructing the optical receiver group B.

With the above-mentioned configuration, the optical cross connect apparatus 1A capable of inputting/outputting WDM light having 80 wavelengths from/to each of the two transmission paths A and B and dropping/adding signal lights having 160 wavelengths is realized. Specifically, in the configuration shown in FIG. 6, by increasing each of the number of output ports of the wavelength selection switches 11'-1 and 11'-2 provided for the input transmission paths A and B and the number of input ports of the multiplexers 12'-1 and 12'-2 provided for the output transmission paths A and B only by one (2 K−1=3), providing two each of the multiplexers 13-1 and 13-2 and the 1×2 wavelength selection switches 14-1 and 14-2 as the multiplexers and 1×2 wavelength selection switches provided for drop signal light, and providing two each of the multiplexers 15-1 and 15-2 and wavelength selectors 16-1 and 16-2 as multiplexers and wavelength selectors for add signal light, the optical cross connect apparatus 1A in which the number of drop/add wavelengths is 160 at the maximum is realized.

The flow of signal light and add/drop signal light according to a path change in the optical cross connect apparatus 1A is similar to that in the case shown in FIG. 5. Specifically, for example, in FIG. 7, when signal lights having the wavelengths λ1 to λ20 out of signal lights having 80 wavelengths λ1 to λ80 input from the input transmission path A are received by any of the optical receivers 3-1 to 3-80 constructing the optical receiver group A, signal lights having wavelengths λ21 to λ40 are received by any of the optical receivers 3-81 to 3-160 constructing the receiver group B, and the transmission path of the signal lights having wavelengths λ41 to λ80 is changed to the transmission path B, each of the signal lights having the wavelengths λ1 to λ20 input from the input transmission path A is output from the output port c2 of the 1×3 wavelength selection switch 11'-1, each of the signal lights having the wavelengths λ21 to λ40 is output from the output port c3 of the 1×3 wavelength selection switch 11'-*i*, and each of the signal lights having the wavelengths λ41 to λ80 is output from the output port c1 of the 1×3 wavelength selection switch 11'-1.

Consequently, each of the signal lights having the wavelengths λ1 to λ20 input from the input transmission path A is dropped and received by any of the optical receivers 3-1 to 3-80 constructing the optical receiver group A via the multiplexer 15-1 and the wavelength selector 16-1, each of the signal lights having the wavelengths λ21 to λ40 is dropped and received by any of the optical receivers 3-81 to 3-160 constructing the optical receiver group B via the multiplexer 15-2 and the wavelength selector 16-2, and each of the signal lights having the wavelengths λ41 to λ80 is output to the output transmission path B via the multiplexer 12'-2.

In the case of outputting add signal lights having wavelengths λ'1 to λ'20 from the optical transmitter group A to the transmission path B and outputting the remaining add signal lights having the wavelengths λ'21 to λ'80 to the transmission path A, in a manner similar to the configuration shown in FIG.

5, the add signal lights having the wavelengths λ'1 to λ'20 are transmitted from the output port d2 of the 1×2 wavelength selection switch 14-1 and the remaining add signal lights having the wavelengths λ'21 to λ'80 are transmitted from the output port d1.

Consequently, the add signal lights having the wavelengths λ'1 to λ'20 are output to the output transmission path B via the multiplexer 12'-2, and the add signal lights having the wavelengths λ'21 to λ'80 are output to the output transmission path A via the multiplexer 12'-1. With respect to addition of add signal lights from the optical transmitter group B, similarly, by selectively outputting each of add signal lights to any of the output ports in the 1×2 wavelength selection switch 14-2 in accordance with a target output transmission path A or B, an add signal light having an arbitrary wavelength can be transmitted to an arbitrary transmission path A or B.

(A2) Description of Second Modification

Figure 8:
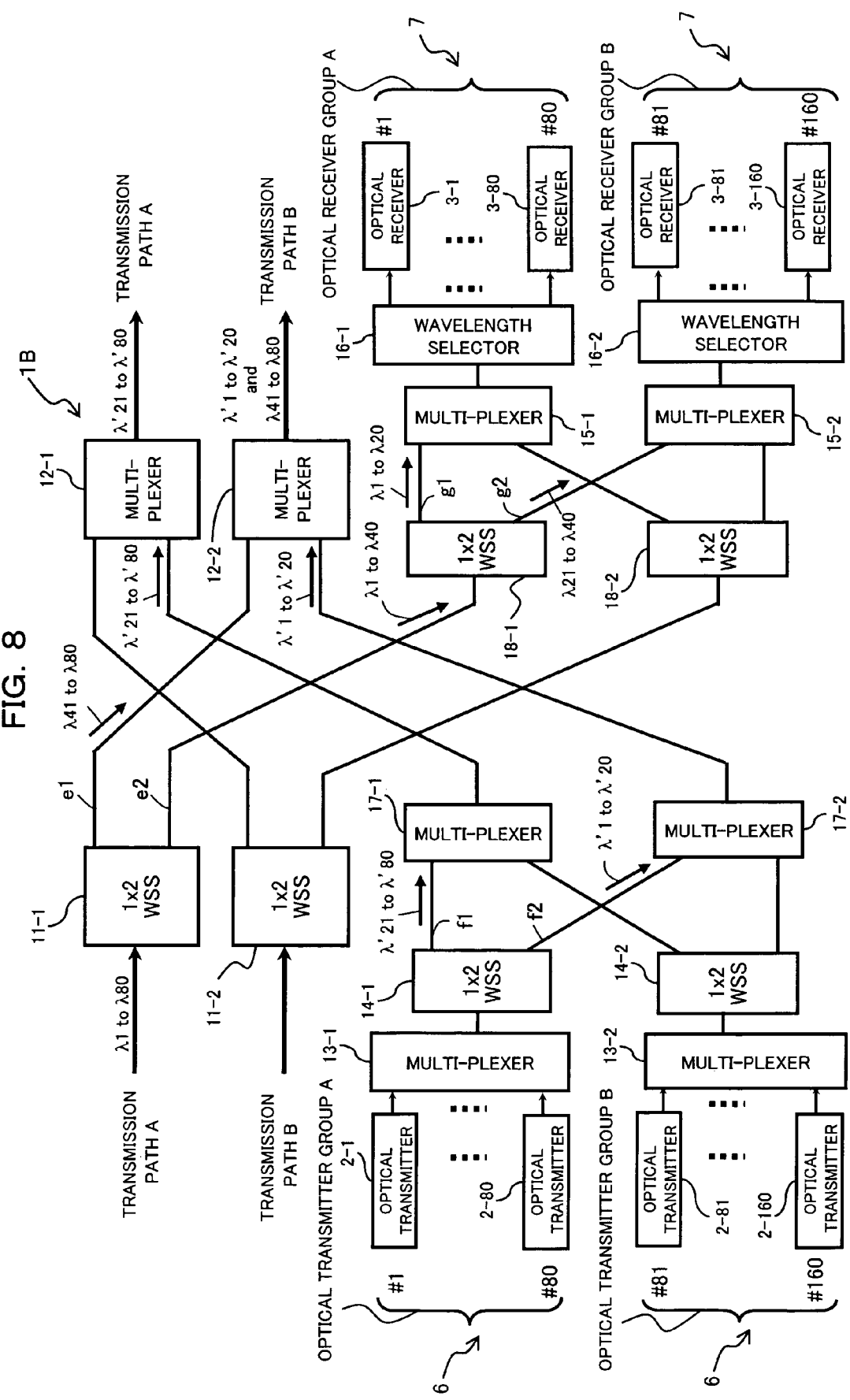
FIG. 8 is a block diagram showing a second modification of the optical cross connect apparatus illustrated in FIG. 1.

FIG. 8 is a block diagram showing a second modification of the optical cross connect apparatus described above by referring to FIGS. 1 and 5. In a manner similar to the foregoing first modification, an optical cross connect apparatus 1B shown in FIG. 8 has a configuration suitable for the case where the number of the drop/add signal light wavelengths exceeds 80. The configuration relates to the case where the transmission path number K=2, wavelength multiplexing number N=80, the number of add signal light wavelength m=160, and the number of drop signal light wavelength n=160 (that is, M_add=M_drop=2). Also in the second modification, in a manner similar to the first modification, the optical transmitters 2-1 to 2-80 out of the optical transmitters 2-1 to 2-160 for 160 wavelengths construct the optical transmitter group A, and the remaining optical transmitters 2-81 to 2-160 construct the optical transmitter group B. The optical receivers 3-1 to 3-80 out of the optical receivers 3-1 to 3-160 for 160 wavelengths construct the optical receiver group A, and the remaining optical receivers 3-81 to 3-160 construct the optical receiver group B.

The optical cross connect apparatus 1B shown in FIG. 8 has K pieces of 1×K wavelength selection switches 11-1 and 11-2 provided for K pieces of output light transmission paths #A and #B for selectively outputting signal lights having one or more arbitrary wavelengths in the input WDM light from any of the minimum K output ports, and K pieces of (K-input 1-output) multiplexers 12-1 and 12-2 provided for K pieces of output light transmission paths #A and #B and each having K pieces of input ports at the minimum and one output port. By connecting one of input ports of (K−1) pieces of the multiplexers 12-1 and 12-1 provided for (K−1) pieces of output optical transmission paths #B and #A different from the input optical transmission paths #A and #B for which the 1×K wavelength selection switches 11-1 and 11-2 are provided to one of the 1×K wavelength selection switches 11-1 and 11-2, the optical cross connect function (optical cross connect means) capable of outputting all of input signal lights to all of output transmission paths #A and #B except for the same path is realized.

For the optical transmitter group A (the optical transmitters 2-1 to 2-80), the multiplexer 13-1 having N input ports and one output port, the 1×K (=2) wavelength selection switch 14-1, and a multiplexer 17-1 having M_add (=2) inputs and one output are provided. For the optical transmitter group B (the optical transmitters 2-81 to 2-160), the N-input 1-output multiplexer 13-2, the 1×K (=2) wavelength selection switch 14-2, and a multiplexer 17-2 having M_add (=2) inputs and one output are provided. For the optical receiver group A (the optical receivers 3-1 to 3-80), a 1×M_drop (=2) wavelength selection switch 18-1, the multiplexer 15-1 having K (=2) input ports and one output port, and the wavelength selector 16-1 are provided. For the optical receiver group B (the optical receivers 3-81 to 3-160), a 1×M_drop (=2) wavelength selection switch 18-2, the multiplexer 15-2 having K (=2) input ports and one output port, and the wavelength selector 16-2 are provided.

The multiplexer (add wavelength multiplexer) 13-1 having N (=80) input ports and one output port multiplexes add signal lights from the optical transmitter group A (optical transmitters 2-1 to 2-80), and the 1×2 wavelength selection switch 14-1 can selectively output add signal lights having one or more arbitrary wavelengths out of output light of the multiplexer 13-1 from any of output ports.

The multiplexer (add wavelength multiplexer) 13-2 having N (=80) input ports and one output port multiplexes add signal lights from the optical transmitter group B (optical transmitters 2-81 to 2-160), and the 1×2 wavelength selection switch 14-2 can selectively output add signal lights having one or more arbitrary wavelengths out of output light of the multiplexer 13-2 from any of output ports.

Each of the multiplexers 17-1 and 17-2 each having M_add (=2) input ports and one output port is connected to one of three output ports of each of the 1×K (=2) wavelength selection switches 14-1 and 14-2 and multiplexes output lights of the wavelength selection switches 14-1 and 14-2. The output of the multiplexer 17-1 is connected to one of the input ports of the multiplexer 12-1, and the output of the multiplexer 17-2 is connected to one of the input ports of the multiplexer 12-2.

The set of the multiplexer 13-1 and the wavelength selection switch 14-1 and the set of the multiplexer 13-2 and the wavelength selection switch 14-2 function as M_add (=2) pieces of add wavelength multiplexing and selecting units each having minimum K pieces of output ports, multiplexing add signal lights having N (=80) wavelengths at the maximum from the optical transmitters 2-1 to 2-80, and selectively outputting add signal lights having one or more arbitrary wavelengths from the output ports. One of the input ports of each of the multiplexers 17-1 and 17-2 each having M_add (=2) input ports and one output port is connected to one of the output ports of each of the M_add (=2) pieces of the add wavelength multiplexing and selecting units. The output port of the multiplexer 17-1 having M_add (=2) input ports and one output port is connected to one of the input ports of the multiplexer 12-1 having K (=2) input ports and one output port, and the output port of the multiplexer 17-2 having M_add (=2) input ports and one output port is connected to one of the input ports of the multiplexer 12-2 having K (=2) input ports and one output port. With the configuration, an adding function (add wavelength output means) capable of outputting add signal lights from arbitrary optical transmitters 2-1 to 2-16 in the optical transmitter groups A and B to an arbitrary transmission path #i (A or B) is realized.

The 1×M_drop (=2) wavelength selection switch (drop light switching means) 18-1 has the input port connected to one of the output ports of the 1×K (=2) wavelength selection switch 11-1 provided for the input transmission path A, and can selectively output signal lights having one or more arbitrary wavelengths in the signal lights from the input transmission path A input via the input port to one of the K (=2) pieces of multiplexers 15-1 and 15-2. The 1×M_drop (=2) wavelength selection switch (drop light switching means) 18-2 has the input port connected to one of the output ports of the 1×K (=2) wavelength selection switch 11-2 provided for the input transmission path B, and can selectively output signal lights having one or more arbitrary wavelengths in the signal lights from the input transmission path B input via the input port to one of the K (=2) pieces of multiplexers 15-1 and 15-2.

One of the K (=2) pieces of input ports of the multiplexer (drop wavelength multiplexer) 15-1 is connected to one of output ports of the 1×M_drop (=2) wavelength selection switch 18-1 and the other input port is connected to one of output ports of the 1×M_drop (=2) wavelength selection switch 18-2. The multiplexer 15-1 multiplexes signal lights from the K(=2) pieces of wavelength selection switches 18-1 and 18-2. One of the K (=2) pieces of input ports of the multiplexer (drop wavelength multiplexer) 15-2 is connected to the remaining (other) output port of the 1×M_drop (=2) wavelength selection switch 18-1, and the other input port is connected to the remaining (other) output port of the 1×M_drop (=2) wavelength selection switch 18-2. The multiplexer 15-2 multiplexes signal lights from the K(=2) pieces of wavelength selection switches 18-1 and 18-2.

The wavelength selector 16-1 selectively outputs signal light having an arbitrary wavelength from the output light of the corresponding multiplexer 15-1 to any of the optical receivers 3-1 to 3-80 constructing the optical receiver group A so as to be received. The wavelength selector 16-2 selectively outputs signal light having an arbitrary wavelength from the output light of the corresponding multiplexer 15-2 to any of the optical receivers 3-81 to 3-160 constructing the optical receiver group B so as to be received.

Each of the set of the multiplexer 15-1 and the wavelength selector 16-1 and the set of the multiplexer 15-2 and the wavelength selector 16-2 is connected to one of the output ports of each of the K (=2) pieces of 1×M_drop (=2) wavelength selection switches 18-1 and 18-2. The sets function as K pieces of drop wavelength multiplexing and selecting units, each multiplexing outputs of each of the K(=2) pieces of 1×M_drop (=2) wavelength selection switches 18-1 and 18-2 and selectively outputting drop signal light having arbitrary wavelengths. The input port of the wavelength selection switch 18-1 is connected to one of the output ports of the 1×K (=2) wavelength selection switch 11-1, and the input port of the wavelength selection switch 18-2 is connected to one of the output ports of the 1×K (=2) wavelength selection switch 11-2. With the configuration, a drop function (drop wavelength output means) capable of selectively dropping signal lights having arbitrary wavelengths from the arbitrary transmission path #i (A or B) so as to be received by any of the optical receivers 3-1 to 3-160 is realized.

Hereinafter, the operation of the optical cross connect apparatus 1B constructed as described above will now be described.

For example, the flow of each signal light will be described below in the case where signal lights having wavelengths $\lambda 1$ to $\lambda 20$ in the signal lights having the wavelengths $\lambda 1$ to $\lambda 80$ input from the transmission path A are received by any of the optical receivers 3-1 to 3-80 in the optical receiver group A, signal lights having wavelengths $\lambda 21$ to $\lambda 40$ are received by any of the optical receivers 3-81 to 3-160 in the optical receiver group B, the path of the signal lights having the wavelengths $\lambda 41$ to $\lambda 80$ is changed to the transmission path B, the add signal lights having the wavelengths $\lambda'1$ to $\lambda'20$ from the optical transmitter group B are output to the transmission path B, and the add signal lights having the remaining wavelengths $\lambda'21$ to $\lambda'80$ are output to the transmission path A.

First, each of the signal lights having the wavelengths $\lambda 41$ to $\lambda 80$ input from the input transmission path A and to be output to the output transmission path B is output from the output port e1 of the 1×2 wavelength selection switch 11-1 and input to the multiplexer 12-2 provided for the output transmission path B, thereby enabling the signal lights to be output to the transmission path B.

On the other hand, the signal lights having the wavelengths $\lambda 1$ to $\lambda 20$ input from the input transmission path A and to be received by any of the optical receivers 3-1 to 3-80 of the optical receiver group A and signal lights having the wavelengths $\lambda 21$ to $\lambda 40$ to be received by any of the optical receivers 3-81 to 3-160 of the optical receiver group B are output from the output port e2 of the 1×2 wavelength selection switch 11-1. The signal lights (drop signal lights) are input to the 1×2 wavelength selection switch 18-1. By the wavelength selection switch 18-1, the signal lights having the wavelengths $\lambda 1$ to $\lambda 20$ are output to the output port g1 and the signal lights having the wavelengths $\lambda 21$ to $\lambda 40$ are output to the output port g2. In such a manner, the drop signal lights are received by an arbitrary one of the optical receivers 3-1 to 3-160 by the multiplexers 15-1 and 15-2 and the wavelength selectors 16-1 and 16-2.

The add signal lights from the optical transmitter group A are multiplexed by the multiplexer 13-1. By the 1×2 wavelength selection switch 14-1, the signal lights having the wavelengths $\lambda'21$ to $\lambda'80$ to be output to the output transmission path A are output from the output port f1, and the signal lights having the wavelengths $\lambda'1$ to $\lambda'20$ to be output to the output transmission path B are output from the output port f2. Since each of the output ports f1 and f2 is connected to one of the input ports of the multiplexers 12-1 and 12-2 provided for the output transmission paths A and B via the multiplexers 17-1 and 17-2, the add signal lights having the wavelengths $\lambda'1$ to $\lambda'20$ can be output to the output transmission path B via the multiplexer 12-2, and the remaining signal lights having the wavelengths $\lambda'21$ to $\lambda'80$ can be output to the output transmission path A via the multiplexer 12-1.

Also with respect to the add signal lights from the optical transmitter group B, similarly, an add signal light having an arbitrary wavelength can be output to an arbitrary output transmission path A or B via the multiplexer 13-2, 1×2 wavelength selection switch 14-2, multiplexers 17-1 and 17-2 and the multiplexers 12-1 and 12-2.

As described above, in the optical cross connect apparatus 1B of the modification, different from the first modification, the number of output ports of the wavelength selection switches 11-1 and 11-2 and the number of input ports of the multiplexers 12-1 and 12-2 provided for the transmission paths A and B can be set to be constant (K) without depending on the number of drop/add signal light wavelengths. Consequently, the number of drop/add signal lights can be increased without exerting an influence on at least the signal lights related to a path change.

The add signal lights are multiplexed by the multiplexers 13-1 and 13-2, add signal lights having one or more arbitrary wavelengths are changed by the wavelength selection switches 14-1 and 14-2, and the add signal lights after the wavelength change are multiplexed by the multiplexers 17-1 and 17-2. On the other hand, the drop signal lights are also changed by the wavelength selection switches 18-1 and 18-2 and, multiplexed by the multiplexers 15-1 and 15-2, and the resultant is input to the wavelength selectors 16-1 and 16-2. Consequently, even if the number of drop/add signal light wavelengths increases, the number of output ports of the wavelength selection switches 11-1 and 11-2 and the number of input ports of the multiplexers 12-1 and 12-2 can be suppressed to the transmission path number K. Therefore, those optical devices having the necessary port number can be realized at the technical level of the present circumstances. Moreover, the modification largely contributes to realization of the optical cross connect apparatus 1B.

Although each of the optical cross connect apparatuses 1, 1A and 1B of the foregoing first embodiment has both of the adding function and the dropping function, the invention is not limited to the configuration. Each of the optical cross connect apparatuses 1, 1A, and 1B may have only one of the functions. The configuration of the add part 6 and the drop part 7 can be properly changed according to the configuration of the optical cross connect apparatus (OADM) 1. Examples of the configuration are (1) passive OADM (POADM), (2) reconfigurable OADM (ROADM), and (3) dynamic OADM (DOADM).

Each of the POADM, ROADM, and DOADM is constructed (defined) as shown in FIG. 9. Specifically, in the POADM, the drop or through wavelength is fixed (not automatically switchable), an arbitrary add signal light wavelength cannot be added to an arbitrary add port, and an arbitrary drop signal light wavelength cannot be dropped to an arbitrary drop port (transponder having a set of the optical transmitter 2 and the optical receiver 3). The POADM is a node in which reconnection between the OADM and the transponder has to be performed manually.

In the case of such a POADM node, for example, as shown in FIG. 10A, the add part 6 uses the optical transmitters 2 each having the fixed transmission wavelength and an AWG (Array Waveguide Grating) as the multiplexer 13. In correspondence with the add part 6, the drop part 7 uses an AWG as the wavelength selector 16 and uses the optical transmitters 3 each having the fixed reception wavelength. In FIG. 10A, reference numerals 8 and 9 denote optical amplifiers for compensating an optical loss caused by the AWGs.

In the ROADM, as shown in the column (2) in FIG. 9, the drop/through wavelengths can be automatically switched. However, like the POADM, an arbitrary add signal light wavelength cannot be added to an arbitrary add port, and an arbitrary drop signal light wavelength cannot be dropped to an arbitrary drop port (transponder). The ROADM is a node in which reconnection between the OADM and the transponder has to be performed manually.

In contrast, in the DOADM, as shown in the column (3) in FIG. 9, the drop/through wavelengths can be automatically switched and, moreover, an arbitrary add signal light wavelength can be added to an arbitrary add port, and an arbitrary drop signal light wavelength can be dropped to an arbitrary drop port (transponder). The DOADM is a node in which reconnection between the OADM and the transponder does not have to be performed manually. In the case of the DOADM node, for example, as shown in FIG. 10B, each of the add part 6 and the drop part 7 can be constructed in three modes.

Specifically, as shown in FIG. 10B, the add part 6 uses the optical transmitters 2 whose transmission wavelength is variable and the multiplexer 13 which can be constructed by (1) an N×1 wavelength selection switch (WSS), (2) an N×1 coupler, or (3) combination of an N×N matrix switch 13a and an AWG 13b. In correspondence with the configuration, the drop part 7 uses the optical receiver 3 whose reception wavelength is variable and the wavelength selector 16 which can be constructed by (1) a 1×N wavelength selection switch (WSS), (2) an N×1 coupler, or (3) combination of an AWG 16b and an N×N matrix switch 16a.

The configurations which can be employed for the add part 6 and the drop part 7 are also similarly applied to the following embodiments.

B. Description of Second Embodiment

FIGS. 11A to 11C are diagrams showing images of an optical node in-service upgrading method (path adding method) according to a second embodiment of the invention. For example, as shown in FIG. 1A, in the case of upgrading an ROADM node (optical transmitting apparatus) 1C of 2 degrees to an optical cross connect (WXC) node of 3 degrees during service operation, as shown in FIG. 11B, by connecting a modular switch (optical switch module) 5-1 to an idle (unused) port for upgrading which is prepared in advance for the ROADM node 1C, the number of paths (transmission paths) is increased. In the case of also preliminarily providing the modular switch 5-1 with an idle (unused) port for upgrading and further increasing the number of paths to construct a WXC node having 4 degrees from the node having 3 degrees, as shown in FIG. 11C, by connecting a modular switch 5-2 having an idle port for upgrading to the idle port of the modular switch 5-1, the number (K) of paths (transmission paths) is increased. Also in FIGS. 11A to 11C, the wavelength multiplexing number N per degree is set to 80 wavelengths. Reference numeral 2 denotes an optical transmitter for add signal light, 3 denotes an optical receiver for drop signal light, and 4 indicates an optical amplifier such as an EDFA (Erbium Doped Fiber Amplifier).

As described above, at the time of initial installation, the node 1C is provided with an idle port for upgrading. In the case of increasing the number of degrees, by sequentially connecting the modular switches 5-1, 5-2, . . . for preparing an idle port for upgrading (hereinbelow, also simply expressed as modular switch 5 when they are not distinguished from each other), the cost may be the minimum at the time of initial installation of the node 1C and the number of degrees can be arbitrarily increased later. With respect to a signal passing through the increased part, since the signal passes through the modular switches 5 in many stages, to prevent deterioration in the optical signal to noise ratio (OSN), it is necessary to prevent or sufficiently reduce an optical loss.

Figure 12:
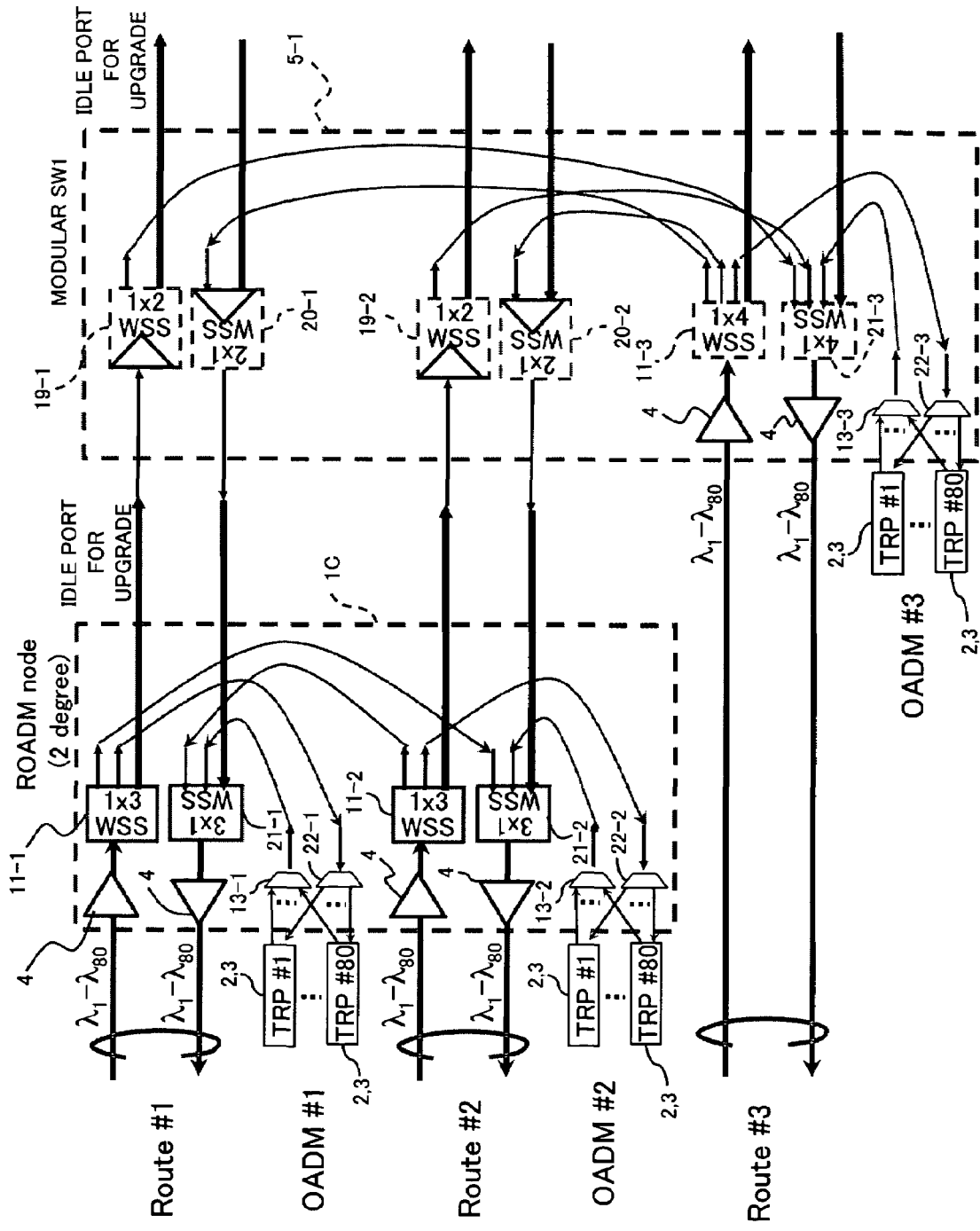
FIG. 12 is a block diagram showing the configuration of an optical node and a modular switch for explaining a concrete example of the optical node in-service upgrading method of the second embodiment.

FIG. 12 shows a concrete example of the image (modular type upgrading) described with reference to FIG. 11. FIG. 12 is a block diagram showing the configuration where the modular switch 5-1 is connected to the node 1C. The configuration shown in FIG. 12 relates to the case where the final number K of degrees=3, and the number of add signal light wavelengths m=the number of drop signal light wavelengths n=80×3 (groups)=240 wavelengths. In FIG. 12, devices drawn by solid lines indicate existing portions (before addition) and devices drawn by broken lines indicate added portions.

Specifically, the node 1C before upgrading has: 1×3 wavelength selection switches 11-1 and 11-2 each having one input port and three output ports for the input transmission paths #1 and #2 (signal lights according to a path change); 3×1 wavelength selection switches 21-1 and 21-2 each having three input ports and one output port for the output transmission paths #1 and #2; and two pieces (=the number K of degrees) each of multiplexers (13-1 and 13-2) each for multiplexing 80 wavelengths and demultiplexers (22-1 and 22-2) each for demultiplexing 80 wavelengths for add/drop signal lights having 160 wavelengths (=80 wavelengths λ1 to λ80×2) (for 160 optical transmitters (Tx) 2 and 160 optical receivers (Rx) 3). In FIG. 12, reference numeral 4 denotes optical amplifiers. FIG. 12 shows a state where a set of the optical transmitter 2 and the optical receiver 3 is provided for each of transponders (TRP) #1 to #80.

In this case as well, like the configuration shown in FIG. 1, one of the three output ports of the 1×3 wavelength selection switch 11-1 provided in correspondence with the input transmission path #1 is connected to one of the input ports of the 3×1 wavelength selection switch 21-2 provided for the output transmission path #2 different from the same transmission path #1. Another one is connected to the demultiplexer 22-2 provided for the optical receiver group #1, and the remaining port is set as an idle (spare) port for upgrading.

Similarly, one of the three output ports of the 1×3 wavelength selection switch 11-2 provided in correspondence with the input transmission path #2 is connected to one of the input ports of the 3×1 wavelength selection switch 21-1 provided for the output transmission path #1 different from the same transmission path #2. Another one is connected to the input port of the demultiplexer 22-1 provided for the optical receiver group #2, and the remaining port is set as an idle port for upgrading.

Figure 13:
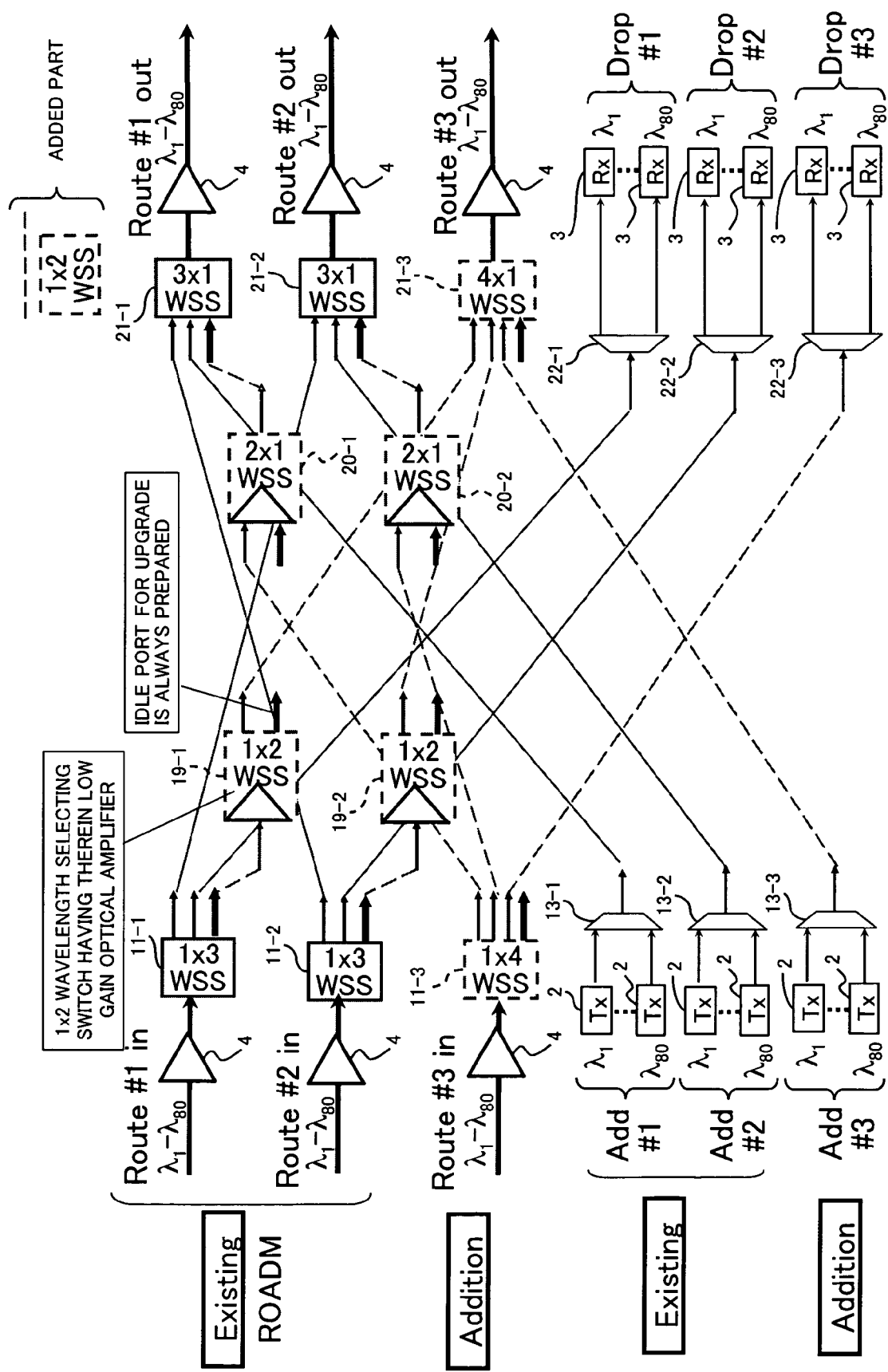
FIG. 13 is a block diagram showing the configuration of the optical node and the modular switch for explaining a concrete example of the optical node in-service upgrading method of the second embodiment.

Consequently, as shown by the paths of solid lines in FIG. 13, the path of a signal light having arbitrary wavelengths from an arbitrary input transmission path #1 or #2 can be changed to an arbitrary output transmission path #1 or #2, and a signal light having arbitrary wavelengths from an arbitrary input transmission path #1 or #2 can be dropped and received by an arbitrary optical receiver 3.

An output of the multiplexer 13-1 provided for the optical transmitter group (add signal light group) #1 is connected to one of input ports of the 3×1 wavelength selection switch 21-1 provided for the output transmission path #1 (the remaining one input port is an idle port), and an output of the multiplexer 13-2 provided for the optical transmitter group (add signal light group) #2 is connected to one of input ports of the 3×1 wavelength selection switch 21-2 provided for the output transmission path #2 (the remaining one input port is an idle port). With the configuration, add signal lights having arbitrary wavelengths from the optical transmitter groups #1 and #2 can be output to the arbitrary output transmission paths #1 and #2.

In the case of upgrading the 2-degree configuration to a 3-degree configuration, that is, in the case of adding a transmission path #3 and an add signal light group (optical transmitter group) #3, as shown in FIG. 12, a modular switch 5 (5-1) having 1×4 wavelength selection switches 11-3 and 21-3, 1×2 wavelength selection switches 19-1 and 19-2, 2×1 wavelength selection switches 20-1 and 20-2, a multiplexer 13-2, and a demultiplexer 22-3 which are fiber-connected in advance as shown in FIG. 12 is connected to the node 1C.

Specifically, as shown in FIGS. 12 and 13, the 1×4 wavelength selection switch 11-3 and the 4×1 wavelength selection switch 21-3 are provided for the added transmission path #3, the wavelength selection switches 19-1 and 19-2 each having one input and k outputs (where k denotes an integer of 2 or larger, in this case k=2) [that is, 1×k (=2)] and the k(=2)-input 1-output (k×1) wavelength selection switches 20-1 and 20-2 are newly provided, the multiplexer 13-3 is provided for the added optical transmitter group #3, and the demultiplexer 22-3 is provided for the added optical receiver group #3.

The input port of the 1×2 wavelength selection switch 19-1 is connected to the idle port of the existing 1×3 wavelength selection switch 11-1 for the input transmission path #1, and one of the two output ports is connected to one of the input ports of the added 4×1 wavelength selection switch 21-3. The remaining (other) output port of the 1×2 wavelength selection switch 19-1 is set as an idle port for further upgrading.

Similarly, the input port of the 1×2 wavelength selection switch 19-2 is connected to the idle port of the existing 1×3 wavelength selection switch 11-2 for the input transmission path #2, and one of the two output ports is connected to another one of the input ports of the added 4×1 wavelength selection switch 21-3. The remaining (other) output port is set as an idle port for further upgrading.

One of the input ports of the added 2×1 wavelength selection switch 20-1 is connected to one of the output ports of the 1×4 wavelength selection switch 11-3 added to the added input transmission path #3, the remaining one is set as the idle port for upgrading, and the output port of the wavelength selection switch 20-1 is connected to the idle port of the existing 3×1 wavelength selection switch 21-1 for the output transmission path #1.

Similarly, one of the input ports of the added 2×1 wavelength selection switch 20-2 is connected to another one of the output ports of the 1×4 wavelength selection switch 11-3 added to the added input transmission path #3, the remaining one is set as the idle port for upgrading, and the output port of the wavelength selection switch 20-2 is connected to the idle port of the existing 3×1 wavelength selection switch 21-2 for the output transmission path #2.

Further, one of the four output ports of the 1×4 wavelength selection switch 11-3 added to the input transmission path #3 is connected to one of the input ports of the added 2×1 wavelength selection switch 20-1, another output port is connected to one of the input ports of the added 2×1 wavelength selection switch 20-2, another output port is connected to the multiplexer 22-3 added to the optical receiver group #3, and the remaining output port is set as the idle port for upgrading.

With respect to four input ports of the 4×1 wavelength selection switch 21-3 added to the output transmission path #3, except for the input ports to which one output port of the 1×2 wavelength selection switch 19-1 and one output port of the 1×2 wavelength selection switch 19-2 are connected, one input port is connected to the output port of the multiplexer 22-3 added to the optical transmitter group #3, and the remaining one port is set as an idle port for upgrading.

By the connection (optical wiring), a signal light having arbitrary wavelengths can be output from arbitrary one of the input transmission paths #1, #2, and #3 to arbitrary one of the output transmission paths #1, #2, and #3, a signal light having arbitrary wavelengths from arbitrary one of the input transmission paths #1, #2, and #3 can be dropped and received by an arbitrary optical receiver 3, and an add signal light having arbitrary wavelengths can be output to arbitrary one of the output transmission paths #1, #2, and #3.

As described above, each of the wavelength selection switches, multiplexers, and demultiplexers (their reference numerals are omitted here) used in the OADM node 1C is used always in a form that at least one port is set as the unused (idle) port for upgrading. Each time the number of degrees is increased, the minimum wavelength selection switch, multiplexer, and demultiplexer are tandem-connected to an idle port. In such a manner, unlike the conventional technique, without preliminarily predicting a final form and preparing necessary spare optical devices such as wavelength selection switches and an enormous number of spare ports from the initial introduction, increase in the number of degrees (upgrading) can be flexibly dealt with the minimum idle ports. In particular, in the case of the embodiment, as understood from FIG. 12, no influence is exerted to transmission of existing signal lights at the time of upgrading, so that service interruption is unnecessary (in other words, in-service upgrading is possible).

For example, the added optical devices (wavelength selection switches, multiplexers, and demultiplexers) and the optical wires between them are constructed as a set of the modular switch 5. As described above by referring to FIGS. 11B and 11C, only by connecting the modular switch 5 to the idle ports prepared in the existing optical devices, the in-service upgrading of the number of degrees can be easily realized and the burden of work at the time of addition can be largely reduced.

To make the quality of a signal passing through the added wavelength selection switches 19-1, 19-2, 20-1, and 20-2 in multiple stages equivalent to the quality before the upgrading, it is preferable to provide a low gain optical amplifier 23 for compensating an optical loss or the like in each of the added wavelength selection switches 19-1, 19-2, 20-1, and 20-2. With the configuration, an optical loss of signal light passing through a plurality of wavelength selection switches in multiple stages can be properly compensated. Even if the number of transmission paths is increased by adding the modular switch 5, necessary transmission characteristics of the signal light can be assured. As the characteristics of the optical amplifier 23, although the gain may be low (about 3 to 5 dB of a loss of the wavelength selection switch), it is desirable to cover the transmission wavelength band and to maintain the same gain even if the input wavelengths change.

Each of the wavelength selection switches 21-1, 21-2, and 21-3 positioned in the final output stage may be constructed by using a multiplexer. From the viewpoint of reducing the kinds of devices at the time of constructing the modular switch 5, it is preferable to use the wavelength selection switch.

(B1) Description of Modification of Second Embodiment

As a modification of the second embodiment, processes for addressing unexpected addition of traffic will be described. For example, as shown in FIG. 14A, when sites (communication points) A, B, and C exist, initially, traffic exists only between the sites A and B and between the sites B and C and no traffic exists between the sites A and C, the configuration of the node 1C is as shown in FIG. 14B.

Specifically, the 1×2 wavelength selection switch 11-1, 1×3 wavelength selection switch 11-2, and 1×2 wavelength selection switch 11-3 are provided for the input transmission paths (hereinbelow, referred to as the input transmission paths #A, #B, and #C) on the sites A, B, and C, respectively, and the 2×1 wavelength selection switch 21-1, 3×1 wavelength selection switch 21-2, and 2×1 wavelength selection switch 21-3 are provided for the output transmission paths (hereinbelow, referred to as the output transmission paths #A, #B, and #C) on the sites A, B, and C, respectively.

For the traffic from the site B to the site A and the traffic from the site B to the site C, one of the output ports of the 1×3 wavelength switch 11-2 for the input transmission path #B is connected to one of the input ports of the 2×1 wavelength selection switch 21-1 for the output transmission path #A, and another output port is connected to one of the input ports of the 3×1 wavelength selection switch 22-2 for the output transmission path #B.

For the traffic from the site A to the site C and the traffic from the site C to the site B, one of the output ports of the 1×2 wavelength switch 11-1 for the input transmission path #A is connected to one of the input ports of the 3×1 wavelength selection switch 22-2 for the output transmission path #B, and one of the output ports of the 1×2 wavelength selection switch 11-3 for the input transmission path #C is connected to one of the input ports of the 2×1 wavelength selection switch 22-2 for the output transmission path #B. The remaining ports are set as idle ports.

As described above, in the communication form shown in FIG. 14A, with respect to a route in which sites exist but there is no traffic in reality, by omitting input/output ports between the site A and the site C of the wavelength selection switch used for the node 1C, the required number of ports of the wavelength selection switch can be reduced. To be specific, wavelength selection switches except for the wavelength selection switches 11-2 and 21-2 for the input transmission path #B and the output transmission path #B can be set as the 1×2 wavelength selection switches 11-1 and 11-3 and the 2×1 wavelength selection switches 21-1 and 21-3.

After that, if an unexpected request for traffic between the sites A and C is made as shown by the double-headed arrow with broken line in FIG. 14A, by applying the above-described "modular method" and using idle ports for upgrading, traffic between the sites A and C can be added in-service.

Specifically, as shown in FIG. 14C, the 1×2 wavelength selection switches 19-1 and 19-2 and the 2×1 wavelength selection switches 20-1 and 20-2 are added, the input port of the 1×2 wavelength selection switch 19-1 is connected to an idle port of the 1×2 wavelength selection switch 11-1 for the input transmission path #A, and the input port of the 1×2 wavelength selection switch 19-2 is connected to an idle port of the 1×2 wavelength selection switch 11-3 for the input transmission path #3.

The output port of the 2×1 wavelength selection switch 20-1 is connected to the idle port of the 2×1 wavelength selection switch 21-1 for the output transmission path #A, and the output port of the 2×1 wavelength selection switch 20-2 is connected to an idle port of the 2×1 wavelength selection switch 21-3 for the output transmission path #C. One of the output ports of the 1×2 wavelength selection switch 19-1 is connected to one of the input ports of the 2×1 wavelength selection switch 20-2, and one of the output ports of the 1×2 wavelength selection switch 19-2 is connected to one of the input ports of the 2×1 wavelength selection switch 20-1. The remaining ports remain idle ports.

With the configuration, optical links in the direction from the site A to the site C and the direction from the site C to the site A for which a traffic request is newly made are established. In this case, for example, by constructing each of a set of the 1×2 wavelength selection switch 19-1 and the 2×1 wavelength selection switch 20-1 and a set of the 1×2 wavelength selection switch 19-2 and the 2×1 wavelength selection switch 20-2 as the modular switch 5, the work burden at the time of upgrading can be largely reduced.

Obviously, the invention is not limited to the foregoing embodiments but can be variously modified without departing from the gist of the invention.

As described above, according to the invention, while largely reducing the number of wires (optical fiber patch cords) (reducing the size of the apparatus) necessary in an optical transmitting apparatus handling a plurality of transmission paths such as an optical cross connect apparatus and largely reducing the number of spare ports necessary at the time of future addition of a transmission path, the flexible expansion of apparatus function can be realized. Thus, the invention is regarded as extremely useful one in the optical communication technique field.

What is claimed is:

1. An optical transmitting apparatus comprising:
   optical path switching means having a plurality of first input ports connected to a plurality of input optical transmission paths for transmitting wavelength division multiplex signal light and a plurality of first output ports connected to a plurality of output optical transmission paths for transmitting wavelength division multiplex signal light, capable of selecting signal light of one or more wavelength included in the wavelength division multiplex signal light received from any of the first input ports and outputting the selected signal light from any of the first output ports;

add wavelength output means which combines add signal light of a plurality of wavelengths to obtain combined signal light and selectively couples add signal light having one or more wavelengths included in the combined signal light, as signal light to be multiplexed to wavelength division multiplex signal light to any of the output optical transmission paths, to any of the first output ports of the optical path switching means; and drop wavelength output means which selectively receives and combines the signal light having one or more wavelengths included in the wavelength division multiplex signal light input to each of the first input ports of the optical path switching means and selectively outputs signal light included in the combined signal light on a wavelength unit basis, wherein the optical transmitting apparatus is an apparatus to which wavelength division multiplex signal light of the maximum N wavelengths (where N denotes an integer of 2 or larger) is input from each of K pieces (where K denotes an integer of 2 or larger) of input optical transmission paths and which outputs wavelength division multiplex signal light of the maximum N wavelengths to each of the K pieces of output optical transmission paths, when the minimum integer of integers M satisfying the relation of M≧I_add/N where wavelength of add signal light to be output to any of the output optical transmission paths is set as I_add and wavelength of drop signal light to be dropped from any of the input optical transmission paths is set as I_drop is M_add and the minimum integer of integers M' satisfying the relation of M'≧I_drop/N is M_drop, the optical path switching means comprises;

K pieces of 1×(K+M_drop−1) wavelength selecting switches, each of which is associated with one of the K pieces of input optical transmission paths, has (K+M_drop−1) second output ports at the minimum, selectively outputs, from a specific second output port which is one of said second output ports, signal light of a plurality of wavelengths among wavelengths of the wavelength division multiplex signal light received via said first input port, and selectively outputs signal light of one or more wavelengths different from those of the signal light output from said specific second output port from each of the remaining second output ports different from said specific second output port; and K pieces of (K+M_add−1)-input 1-output multiplexers provided for the K pieces of output optical transmission paths and having (K+M_add−1) second input ports at the minimum, to one of the 1×(K+M_drop−1) wavelength selecting switches, one of the second input ports provided for the (K−1) pieces of output optical transmission paths different from the input optical transmission path for which the 1×(K+M_drop−1) wavelength selecting switch is provided is connected, the add wavelength output means has M_add pieces of add wavelength multiplexing and selecting units each of which is connected to one of the second input ports, multiplexes the add signal light of N wavelengths at the maximum, and selectively outputs add signal light of one or more arbitrary wavelengths to any of the K pieces of (K+M_add−1)-input 1-output multiplexers, and the drop wavelength output means has M_drop pieces of drop wavelength multiplexing and selecting units each of which is connected to one of the second output ports, multiplexes outputs of the K pieces of 1×(K+M_drop−1) wavelength selecting switches, and selectively outputs drop signal light having arbitrary wavelength.

2. The optical transmitting apparatus according to claim 1, wherein the add wavelength multiplexing and selecting unit comprises:

an add signal light multiplexer for multiplexing the add signal light; and a 1×K wavelength selecting switch connected to one of the second input ports of each of the K pieces of (K+M_add−1)-input 1-output multiplexer and selectively outputting signal light having one or more arbitrary wavelengths included in output light of the add signal light multiplexer to one of the second input ports of each of the K pieces of (K+M_add−1)-input 1-output multiplexers.

3. The optical transmitting apparatus according to claim 2, wherein the drop wavelength multiplexing and selecting unit comprises:

a drop signal light multiplexer connected to each of the second output ports and multiplexing outputs of the K pieces of 1×(K+M_drop−1) wavelength selecting switches; and a wavelength selector for selectively outputting signal light having arbitrary wavelength included in output light of the drop signal light multiplexer.

4. The optical transmitting apparatus according to claim 1, wherein the drop wavelength multiplexing and selecting unit comprises:

a drop signal light multiplexer connected to each of the second output ports and multiplexing outputs of the K pieces of 1×(K+M_drop−1) wavelength selecting switches; and a wavelength selector for selectively outputting signal light having arbitrary wavelength included in output light of the drop signal light multiplexer.

5. An optical transmitting apparatus comprising:

optical path switching means having a plurality of first input ports connected to a plurality of input optical transmission paths for transmitting wavelength division multiplex signal light and a plurality of first output ports connected to a plurality of output optical transmission paths for transmitting wavelength division multiplex signal light, capable of selecting signal light of one or more wavelengths included in the wavelength division multiplex signal light received from any of the first input ports and outputting the selected wavelength signal light from any of the first output ports;

add wavelength output means which combines add signal light having a plurality of wavelengths to obtain a combined signal light and selectively couples add signal light having one or more wavelengths included in the combined signal light, as signal light to be multiplexed to wavelength division multiplex signal light to any of the output optical transmission paths, to any of the first output ports of the optical path switching means; and drop wavelength output means which selectively receives and combines the signal light having one or more wavelengths included in the wavelength division multiplex signal light input to each of the first input ports of the optical path switching means and selectively outputs signal light included in the combined signal light on a wavelength unit basis, wherein the optical transmitting apparatus is an apparatus to which wavelength division multiplex signal light of the maximum N wavelengths (where N denotes an integer of 2 or larger) is input from each of K pieces (where K denotes an integer of 2 or larger) of input optical transmission paths and which outputs wavelength division multiplex signal light of the maximum N wavelengths to each of the K pieces of output optical transmission paths, when the minimum integer of integers M satisfying the relation of M≧I_add/N where wavelength of add signal light to be output to any of the output optical transmission paths is set as I_add and wavelength of drop signal light to be dropped from any of the input optical transmission paths is set as I_drop is M_add and the minimum integer of integers M' satisfying the relation of M'≧I_drop/N is M_drop, the optical path switching means comprises:
K pieces of 1×K wavelength selecting switches, each of which is associated with one of the K pieces of input optical transmission paths, has K second output ports at the minimum, selectively outputs, from a specific second output port which is one of said second output ports, signal light of a plurality of wavelengths among wavelengths of the wavelength division multiplex signal light received via said first input port, and selectively outputs signal light of one or more wavelengths different from those of the signal light output from said specific second output port from each of the remaining second output ports different from said specific second output port; and K pieces of K-input 1-output multiplexers provided for the K pieces of output optical transmission paths and having K second input ports at the minimum, to one of the 1×K wavelength selecting switches, one of the second input ports provided for the (K−1) pieces of output optical transmission paths different from the input optical transmission path for which the 1×K wavelength selecting switch is provided is connected, the add wavelength output means comprises:
M_add pieces of add wavelength multiplexing and selecting units each having K pieces of third output ports at the minimum, multiplexing the add signal light of the N wavelengths at the maximum, and selectively outputting add signal light having arbitrary one or more wavelengths from the third output ports; and K pieces of M_add-input 1-output multiplexers each having M_add pieces of third input ports and a fourth output port, each of the third input ports is connected to one of the third output ports, and the fourth output port is connected to one of the second input ports, and the drop wavelength output means comprises:
K pieces of 1×M_drop wavelength selecting switches, each of which is associated with one of the second output ports, has M_drop fifth output ports at the minimum, outputs, from a specific fifth output port which is one of said fifth output ports, signal light of a plurality of wavelengths among wavelengths of output light from one of the second output ports, and outputs signal light of one or more wavelengths different from those of the signal light output from said specific fifth output port from each of the remaining fifth output ports different from said specific fifth output port; and M_drop pieces of drop wavelength multiplexing and selecting units each connected to one of the fifth output ports, multiplexing outputs of the K pieces of 1×M_drop wavelength selecting switches, and selectively outputting drop signal light having arbitrary wavelength.

6. The optical transmitting apparatus according to claim 5, wherein the add wavelength multiplexing and selecting unit comprises:
an add wavelength multiplexer for multiplexing the add signal light; and
a 1×K wavelength selecting switch connected to one of the second input ports of each of the K pieces of the M_add-input 1-output multiplexers and selectively outputting signal light having one or more arbitrary wavelengths included in output light of the add wavelength multiplexer to one of the second input ports of each of the K pieces of M_add-input 1-output multiplexers.

7. The optical transmitting apparatus according to claim 6, wherein the drop wavelength multiplexing and selecting unit comprises:
a K-input 1-output drop wavelength multiplexer for multiplexing outputs from one of the fifth output ports of each of the K pieces of 1×M_drop wavelength selecting switches; and
a wavelength selector for selectively outputting signal light having arbitrary wavelength included in output light of the drop signal light multiplexer.

8. The optical transmitting apparatus according to claim 5, wherein the drop wavelength multiplexing and selecting unit comprises:
a K-input 1-output drop wavelength multiplexer for multiplexing outputs from one of the fifth output ports of each of the K pieces of 1×M_drop wavelength selecting switches; and
a wavelength selector for selectively outputting signal light having arbitrary wavelength included in output light of the drop wavelength multiplexer.

* * * * *